US012638325B2

(12) United States Patent
Kirst

(10) Patent No.: US 12,638,325 B2
(45) Date of Patent: May 26, 2026

(54) METHOD FOR CHECKING A VIBRONIC MEASURING SYSTEM

(71) Applicant: Endress+Hauser Flowtec AG, Reinach (CH)

(72) Inventor: Michael Kirst, Lörrach (DE)

(73) Assignee: Endress+Hauser Flowtec AG, Reinach (CH)

( * ) Notice: Subject to any disclaimer, the term of this patent is extended or adjusted under 35 U.S.C. 154(b) by 355 days.

(21) Appl. No.: 18/249,298

(22) PCT Filed: Sep. 13, 2021

(86) PCT No.: PCT/EP2021/075130
§ 371 (c)(1),
(2) Date: Apr. 17, 2023

(87) PCT Pub. No.: WO2022/078687
PCT Pub. Date: Apr. 21, 2022

(65) Prior Publication Data
US 2023/0392972 A1 Dec. 7, 2023

(30) Foreign Application Priority Data
Oct. 16, 2020 (DE) ..................... 10 2020 127 382.7

(51) Int. Cl.
*G01F 25/10* (2022.01)
*G01F 1/84* (2006.01)

(52) U.S. Cl.
CPC ............ *G01F 25/10* (2022.01); *G01F 1/8422* (2013.01); *G01F 1/8427* (2013.01)

(58) Field of Classification Search
CPC ............. G01N 29/4463; G01N 29/069; G01N 29/265; G01N 29/27; G01N 2291/106; G01N 29/0645; G01N 29/0654; G01N 29/32; G01N 2291/2634; G01N 29/043; G01N 29/262; G01N 29/4436; G01N 9/36; G01P 21/02; G01F 25/10
USPC ............ 73/1.02, 1.06, 1.16, 1.37, 1.82, 1.83
See application file for complete search history.

(56) References Cited

FOREIGN PATENT DOCUMENTS

| DE | 102014107849 A1 | 12/2015 |
| DE | 102019133328 A1 | 6/2020 |

*Primary Examiner* — Robert R Raevis
(74) *Attorney, Agent, or Firm* — Kelly J. Smith; Endress+Hauser (USA) Holding, Inc.

(57) ABSTRACT

A measuring transducer has a vibration element, an electro-mechanical oscillation exciter, and a sensor for registering mechanical oscillations at a first measuring point and providing oscillation signal representing movements of the vibration element, and a housing for the measuring transducer. The oscillation exciter, the first oscillation sensor and the vibration element are arranged within the housing. The method includes positioning a (test-) magnetic for producing a (test-) magnetic field causing vibration for producing a test signal, using the test signal for ascertaining a characterizing number value, which quantifies an oscillation characterizing number, and comparing the characterizing number value with threshold values for the oscillation characterizing number to detect a disturbance of the measuring system, when the characterizing number value exceeds a corresponding threshold value, or has left a value range bounded by the threshold value.

34 Claims, 3 Drawing Sheets

METHOD FOR CHECKING A VIBRONIC MEASURING SYSTEM

CROSS-REFERENCE TO RELATED APPLICATIONS

The present application is related to and claims the priority benefit of DPMA Patent Application No. 10 2020 127 382.7, filed on Oct. 16, 2020 and International Patent Application No. PCT/EP2021/075130, filed on Sep. 13, 2021, the entire contents of which are incorporated herein by reference.

TECHNICAL FIELD

The invention relates to a vibronic measuring system, especially a Coriolis-mass flow-measuring device, for measuring a mass flow of a fluid measured substance.

BACKGROUND

In industrial measurements technology—especially also connected with the control and monitoring of automated methods of production—often used for highly accurate measuring of one or more measured variables, for example, mass flow and/or density, of a measured substance, for example, a liquid, a gas or a dispersion, flowing in a process line, for example, a pipeline, are vibronic measuring systems formed by means of a measuring electronics—most often formed by means of at least one microprocessor—as well as a vibration-type measuring transducer electrically connected with the electronics and flowed through during operation by the substance to be measured.

Examples of such measuring systems formed, for example, also as Coriolis mass flow measuring devices, Coriolis-mass flow-density-measuring devices and/or Coriolis-mass flow-viscosity-measuring devices, are described in, among others, EP-A 564 682, EP-A 816 807, US-A 2002/0033043, US-A 2002/0157480, US-A 2006/0096390, US-A 2007/0062309, US-A 2007/0119264, US-A 2008/0011101, US-A 2008/0047362, US-A 2008/0190195, US-A 2008/0250871, US-A 2010/0005887, US-A 2010/0011882, US-A 2010/0257943, US-A 2011/0161017, US-A 2011/0178738, US-A 2011/0219872, US-A 2011/0265580, US-A 2011/0271756, US-A 2012/0123705, US-A 2013/0042700, US-A 2016/0071639, US-A 2016/0313162, US-A 2016/0187176, US-A 2017/0003156, US-A 2017/0261474, U.S. Pat. Nos. 4,491,009, 4,756,198, 4,777,833, 4,801,897, 4,876,898, 4,996,871, 5,009,109, 5,287,754, 5,291,792, 5,349,872, 5,705,754, 5,796,010, 5,796,011, 5,804,742, 5,831,178, 5,854,430, 5,945,609, 5,965,824, 6,006,609, 6,092,429, 6,223,605, 6,311,136, 6,477,901, 6,505,518, 6,513,393, 6,651,513, 6,666,098, 6,711,958, 6,840,109, 6,883,387, 6,920,798, 7,017,424, 7,040,181, 7,077,014, 7,143,655, 7,200,503, 7,216,549, 7,296,484, 7,325,462, 7,360,451, 7,665,369, 7,792,646, 7,954,388, 8,201,460, 8,333,120, 8,695,436, WO-A 00/19175, WO-A 00/34748, WO-A 01/02812, WO-A 01/02816, WO-A 01/71291, the WO-A 02/060805, WO-A 2005/050145, WO-A 2005/093381, WO-A 2007/043996, WO-A 2008/013545, WO-A 2008/059262, WO-A 2009/148451, WO-A 2010/099276, WO-A 2013/092104, WO-A 2014/151829, WO-A 2016/058745, WO-A 2017/069749, WO-A 2017/123214, WO-A 2017/137347, WO-A 2017/143579, WO-A 2018/160382, WO-A 2018/174841, WO-A 85/05677, WO-A 88/02853, WO-A 88/03642, WO-A 89/00679, WO-A 94/21999, WO-A 95/03528, WO-A 95/16897, WO-A 95/29385, WO-A 95/29386, WO-A 96/07081, WO-A 98/02725, WO-A 99/40394, WO-A 2018/028932, WO-A 2018/007176, WO-A 2018/007185, WO-A 2019/017891, WO-A 2019/068553, WO-A 2020/126282, WO-A 2020/126283, WO-A 2020/126286 and the previously unpublished German patent application DE 102020121681.5.

The measuring transducers of each of the therein displayed measuring systems comprise at least one vibration element, which typically is embodied as an at least sectionally straight and/or at least sectionally bent, e.g. U-, V-, S-, Z- or Q-shaped, (measuring-)tube having a lumen surrounded by a tube wall for conveying the measured substance, or which—, such as shown, among others, also in WO-A 2018/160382, US-A 2016/0187176 and WO-A 2019/068553—, for example, can also be embodied as a displacement element placed within a lumen of a tube flowed through by the measured substance. The at least one vibration element is adapted to be contacted by the measured substance, for example, to be flowed through and/or flowed around by the measured substance, and during that to be caused to vibrate, especially in such a manner that it executes wanted oscillations, namely mechanical oscillations about a rest position with a wanted frequency also co-determined by the density of the medium and, consequently, usable as a measure for the density. In the case of conventional, particularly Coriolis, mass flow-measuring devices with vibration element embodied as measuring tube, typically bending oscillations at a natural resonant frequency serve as wanted oscillations, for example, such bending oscillations, which correspond to a measuring transducer inherent, natural bending oscillation fundamental mode, in the case of which the oscillations of the vibration element are resonant oscillations, which have exactly one oscillatory antinode. The wanted oscillations are in the case of an at least sectionally bent measuring tube as vibration element, additionally, typically, so embodied that the measuring tube moves in a pendulum-like manner about an imaginary oscillation axis imaginarily connecting an inlet end and an outlet end of the measuring tube, in the manner of a cantilever clamped on one end, while, in contrast, in the case of measuring transducers having a straight measuring tube as vibration element the wanted oscillations are most often bending oscillations in a single imaginary plane of oscillation. It is, additionally, known, for example, for the purpose of executing recurring checking of the measuring transducer during operation of the measuring device, to excite the at least one vibration element, at times, also to forced oscillations outside of resonance or, at times, also to enable free, damped oscillations of the at least one vibration element, as well as, in each case, to evaluate the oscillations, for instance, in order, such as, among others, also described in the aforementioned EP-A 816 807, US-A 2011/0178738 and US-A 2012/0123705, to detect possible damage to the at least one vibration element as early as possible, especially damage bringing about an undesired lessening of the accuracy of measurement and/or lessening of the operating safety of the measuring device.

In the case of measuring transducers with two vibration elements formed as measuring tubes, these are most often inserted into the process line via a manifold extending on the inlet side between the measuring tubes and an inlet end connecting flange as well as via a manifold extending on the outlet side between the measuring tubes and an outlet side connecting flange. In the case of measuring transducers having a single measuring tube as vibration element, such communicates with the process line most often via a connecting tube on the inlet side as well as via a connecting tube on the outlet side. Measuring transducers with a single measuring tube as vibration element further comprise at least one other vibration element, namely a vibration element embodied as a counteroscillator, for example, a tube-, box- or plate shaped counteroscillator, which is, equally as well, not contacted by the measured substance, and which is coupled at the inlet side to the measuring tube to form a first coupling zone and at the outlet side to the measuring tube to form a second coupling zone. During operation, the counteroscillator essentially rests or oscillates oppositely to the measuring tube. The inner part of the measuring transducer formed, in such case, by measuring tube and counteroscillator is most often held in a transducer-protective housing alone by means of the two connecting tubes, via which the measuring tube communicates with the process line during operation, especially in a manner enabling oscillations of the inner part relative to the transducer-protective housing. In the case of the measuring transducers illustrated, for example, in U.S. Pat. Nos. 5,291,792, 5,796,010, 5,945,609, 7,077,014, US-A 2007/0119264, WO-A 01/02 816 and WO-A 99/40 394 having a single, essentially straight measuring tube, the latter and the counteroscillator are, such as quite usual in the case of conventional measuring transducers, oriented essentially coaxially with one another, in that the counteroscillator is embodied as an essentially straight, hollow cylinder and the measuring transducer is so arranged that the measuring tube is, at least partially, surrounded by the counteroscillator. Used as material for the counteroscillator, especially also in the case of application of titanium, tantalum or zirconium for the measuring tube, is, most often a comparatively cost effective steel type, such as, for instance, structural steel or free-machining steel.

For the active exciting and maintaining of oscillations of the at least one vibration element, particularly also of the above described, wanted oscillations, vibration-type measuring transducers have, additionally, at least one electromechanical, typically likewise electrodynamic, oscillation exciter acting during operation on the at least one vibration element. The oscillation exciter electrically connected by means of a pair of electrical connection lines, for example, in the form of connection wires and/or conductive traces of a flexible circuit board, to the above described measuring system electronics and operated by an electrical driver signal generated and appropriately conditioned in a drive electronics provided in the measuring system-electronics, namely an electrical driver signal adapted at least to changing oscillation characteristics of the at least one vibration element, serves to convert an electrical excitation power supplied by means of the driver signal into a driving force acting on the at least one vibration element at a point of engagement formed by the oscillation exciter. The drive electronics is, especially, also adapted so to set the driver signal by means of internal control that it has a signal frequency corresponding to the wanted frequency to be excited, at times, also a wanted frequency changing as a function of time, in given cases, at an oscillation amplitude predetermined by an exciter current, namely an electrical current of the driver signal. The driver signal can, for example, during operation of the measuring device, at times, also be turned off, for example, for the purpose of enabling the above described, free, damped oscillations of the at least one vibration element or, for example, such as provided in the above cited WO-A 2017143579, in order to protect the drive electronics against overloading.

Oscillation exciters of usual vibration-type measuring transducers are typically implemented in the manner of a plunger coil working according to the electrodynamic principle, namely an air coil and magnet-arrangement, which is formed by means of an air coil (in the case of measuring transducers having vibration elements formed by a measuring tube and a counteroscillator coupled thereto most often secured on the latter), namely a coil having no magnetic core, but, instead, an air enclosing coil, as well as a permanent magnet interacting with the at least one air coil and serving as armature, for example, a permanent magnet correspondingly secured on the aforementioned measuring tube, wherein the air coil is positioned, at least partially, in an air gap of the permanent magnet containing a magnetic flux. Permanent magnet and air coil are, in such case, usually so oriented that they extend essentially coaxially with one another, and are, additionally, adapted to be moved relative to one another, in fact, opposite-equally, in such a manner that in the case of exciter current flowing through the air coil the permanent magnet and the air coil located in its air gap are moved essentially translationally back and forth. Moreover, however, electromagnetic oscillation exciters are also known, for example, from the above cited US-A 2002/0157480 and U.S. Pat. No. 5,854,430. Additionally, in the case of conventional measuring transducers, the oscillation exciter is most often so embodied and placed that it acts essentially centrally, i.e. on the halfway point, of the at least one measuring tube. Alternatively to one oscillation exciter acting rather centrally and directly on the at least one vibration element, as disclosed in, among others, the above mentioned U.S. Pat. No. 6,092,429, for example, also two oscillation exciters secured not at the halfway point of the at least one vibration element, but, instead, rather at the in—, and outlet sides can be used for the active exciting of mechanical oscillations of the at least one vibration element, or, such as, among others, provided in U.S. Pat. Nos. 6,223,605 and 5,531,126, for example, also oscillation exciters acting between the at least one vibration element and the transducer-protective housing can be used.

Because of the wanted oscillations of the at least one vibration element, particularly also for the case that the wanted oscillations of the at least one vibration element are bending oscillations acting on the flowing measured substance transversely to the flow direction, as is known, Coriolis forces, also dependent on the instantaneous mass flow, are induced in the measured substance. These can, in turn, bring about Coriolis oscillations of the vibration element dependent on mass flow, superimposed on the wanted oscillations, and also having the wanted frequency, in such a manner that between inlet side and outlet side oscillatory movements of the at least one measuring tube executing the wanted oscillations and at the same time flowed through by the medium, a travel time, or phase, difference, also dependent on mass flow and, consequently, usable for measuring mass flow, can be detected. In the case of an at least sectionally bent measuring tube as vibration element, where there is used for the wanted oscillations an oscillation form, in which the measuring tube is caused to move like a pendulum in the manner of a cantilever clamped on one end, the resulting Coriolis oscillations correspond, for example, to those of a bending oscillation mode—, sometimes also referred to as a twist mode —, in the case of which the measuring tube executes rotary oscillations about an imaginary rotary oscillation axis directed perpendicularly to the mentioned imaginary oscillation axis, while, in contrast, in the case of a straight measuring tube as vibration element, whose wanted oscillations are embodied as bending oscillations in a single imaginary plane of oscillation, the Coriolis oscillations are, for example, bending oscillations essentially coplanar with the wanted oscillations.

For registering both inlet side as well as also outlet side, oscillatory movements of the at least one vibration element, particularly also those corresponding to the mentioned wanted oscillations, and for producing at least two electrical oscillation signals influenced by the mass flow to be measured, measuring transducers of the type being discussed have, furthermore, two or more oscillation sensors mutually spaced along the at least one vibration element, for example, in each case, electrically connected by means of a suitable pair of electrical connection lines with a measuring system-electronics described above. Each of the oscillation sensors is adapted to register the above described oscillatory movements at a respective measuring point and, in each case, to transduce such into an electrical oscillatory signal representing the oscillatory movements and containing a wanted component, namely a (spectral) signal-, i.e. namely an alternating voltage component having a (signal-)frequency corresponding to the wanted frequency and an (signal-) amplitude dependent on the wanted frequency and on a magnetic flux established in the oscillation sensor. The oscillatory signals go to the measuring system-electronics, for example, a measuring- and control-electronics of the measuring system-electronics and formed by means of at least one microprocessor, for additional processing, in given cases, digital processing. Additionally, the at least two oscillation sensors are so embodied and arranged that the above-mentioned wanted component of the oscillation signals generated therewith have additionally, in each case, a phase angle dependent on mass flow, in such a manner that a travel time-, or phase, difference between the wanted components of the two oscillation signals and dependent on mass flow is measurable. Based on the phase difference, the measuring system-electronics ascertains recurringly the mass flow-measured values representing mass flow. In addition to measuring the mass flow, for instance, based on the wanted frequency and/or on an electrical excitation power required for exciting and maintaining the wanted oscillations, or based on ascertained damping of the wanted oscillations, supplementally also the density and/or viscosity of the medium can be measured and output from the measuring system-electronics, together with the measured mass flow, as qualified, measured values. Typically, the two oscillation sensors are embodied as electrodynamic oscillation sensors, especially equally to the at least one oscillation exciter, thus formed as plunger coils, in each case, by means of an air coil and magnet-arrangement, in the case of which likewise, in each case, an air coil is positioned, at least partially, in an air gap of an associated permanent magnet containing a magnetic flux and in the case of which, additionally, air coil and permanent magnet are adapted to move relative to one another for the purpose of generating an induced voltage, in such a manner that the air coil is moved essentially translationally back and forth in the air gap. The permanent magnet and the air coil are, in such case, usually so oriented that they extend essentially coaxially with one another.

As discussed in, among others, the above referenced US-A 2007/0113678, US-A 2012/0123705, US-A 2016/0349091, US-A 2016/0123836, US-A 2016/0138997, U.S. Pat. Nos. 7,392,709, 7,562,586, WO-A 03/021205, WO-A 2005/050145, WO-A 2011/019345, WO-A 2013/002759, WO-A 2013/009307, WO-A 2017/069749, WO-A 93/01472 and WO-A 99/39164, vibration-type measuring transducers, consequently the measuring systems formed therewith, can, during their lifetime, most often over a number of years, be exposed to multiple loadings, which can bring about considerable deviations of the measuring system from an earlier ascertained, reference state, for instance, per calibration in the manufacturer's plant and/or at start-up of the measuring system, and, associated therewith, significantly reduce the accuracy of measurement of the measuring system, with which it ultimately maps the measured variable to be registered, particularly also the mass flow and the density, into the corresponding measured values. Examples of such loadings leading, as a result, to generally irreversible changing of oscillation characteristics of the at least one vibration element, be they occurring only once or multiply, or steadily or only for a short length of time, include high (super-elevated-)temperatures, temperature shock or other thermally related overloadings of the at least one vibration element, high pressure surges in the measured substance, excessive clamping forces and/or shaking forces on the measuring transducer coming from the process line, and, associated therewith, crack formation and/or plastic deformation in the at least one vibration element, loadings on the part of the measured substance conveyed in the measuring transducer, for example, as a result of corrosion and/or abrasion, eroding of the at least one vibration element, the forming of accretion on the measured substance contacting (in-)side of the at least one vibration element, and material fatigue or other wear phenomena on the at least one vibration element. Moreover, during the lifetime of the measuring system, also the at least one oscillation exciter, as well as also each of the oscillation sensors, can, for instance, by thermally related overloading, or aging, undergo changes relevant for the accuracy of measurement, for instance, in such a manner that, as a result, an electrical impedance of the measuring transducer is changed. As a result of such (over-)loadings of the measuring transducer, it can regularly be assumed that one or more measuring transducer immanent, system functions (transfer functions) characterizing an oscillatory response of the vibration element, for example, a functional dependence of the wanted oscillations, or the oscillation signals, on the driver signal, or one or more functional dependencies of the wanted oscillations, or the oscillation signals, on the driver signal and the flow- and/or substance parameters of the measured substance, has changed in comparison to an original measuring transducer immanent (reference-)system function. As examples of such system functions of the measuring transducer can be mentioned, among others, a mass flow to phase difference, system function, according to which the above-mentioned phase difference of the wanted-signal components of the oscillation signals is dependent on mass flow, or a density to resonant frequency, system function of the measuring transducer, according to which one or more resonance frequencies of the vibration element are dependent on the density of the measured substance. Equally affected by such (over-) loadings of the measuring transducers are also measuring functions of the measuring system involving the above described system functions of the measuring transducer, according to which the measuring system, as a whole, converts the, in each case, registered measured variable into the relevant measured values, for example, a mass flow to measured value-measurement function of the measuring system, according to which ascertained mass flow-measured values are dependent on the mass flow and composed of the above described mass flow to phase difference-system function of the measuring transducer and a phase difference to mass flow-measured value-characteristic line function, namely a characteristic line function implemented in the measuring system-electronics, according to which phase differences ascertained therewith are converted into mass flow, measured values. In the case of the phase difference to mass flow-measured value-characteristic line function, such can be, for example, a (linear) parameter function having a (scale-)zero point corresponding to a phase difference of the wanted-signal component measured in the case of resting measured substance and a (measuring-)sensitivity, which corresponds to a change of the phase difference of the wanted-signal component (slope of the characteristic line function) relative to a change of the mass flow. As other examples of such system functions, and measuring functions formed therewith, there can be mentioned, among others, also a density to resonant frequency, system function of the measuring transducer, i.e. a density to measured value (measuring-)function of measuring system involving this as well as a resonance frequency to density-measured value-characteristic line function of the measuring system-electronics and/or a viscosity to damping system function of the measuring transducer, i.e. a viscosity to measured value-(measuring-)function of measuring system involving this as well as a damping to viscosity measured value characteristic line function of the measuring system-electronics. The change of a system function can, accordingly, show itself, for example, as a drift of one or more of the characteristic line parameters of one or more of the above described characteristic line functions, in the case of a linear parameter function, for example, its zero point and/or its slope.

This change of one or more of the system functions of the measuring transducer, or one or more of the measuring functions of the measuring system, can, at times, also lead to the fact that the measuring transducer, and the measuring system formed therewith, as a whole, is defective, such that a typically high accuracy of measurement desired for such measuring systems is no longer assured, consequently an ability of the measuring system to function is, in considerable measure, degraded, in given cases, even stopped working, and a corresponding disturbance of the affected measuring system is present. Additionally, as a result of such overloadings influencing, as a whole, particularly also the structural integrity of the measuring transducer, in given cases, even damage to the vibration element, or to the measuring transducer formed therewith, leading to leakage or explosion can be possible. Such changes relevant also for the operating safety of measuring systems of the type being discussed can, for instance, in the case of toxic and/or easily inflammable measured substances, or in the case of gases under high pressure, have quite catastrophic consequences for the entire process plant as well as for personnel in the plant.

Taking this into consideration, measuring systems of the type being discussed are usually recurringly, correspondingly, checked, for instance, in the course of a rotational, predictive maintenance, in order, when required, particularly namely in the case of detecting the presence of a disturbance of the measuring system, to be able to introduce corresponding repair measures as quickly as possible. Such repair measures can in the case of a lasting lessening of the accuracy of measurement include, for example, a program modification bringing about a re-calibration of the measuring system-electronics, or in the case of a wear or mechanical damage of the measuring transducer, its replacement or, such as, among others, mentioned in WO-A 2019/017891, a replacement of the vibration element. For the purpose of an as early as possible detecting of such disturbances of measuring systems of the type being discussed, especially brought about by a permanent lessening of the accuracy of measurement and/or a degrading of the operating safety, it is provided in, among others, US-A 2012/0123705, US-A 2010/0011882, WO-A 2005/050145, WO-A 2013/002759, WO-A 2017/069749, WO-A 2011/019345, WO-A 96/05484, WO-A 99/39164, U.S. Pat. Nos. 4,680,974, 5,796,010, 5,728,952, 5,926,096 or DE102019124709.8, recurringly on-site, to subject a measuring system to a corresponding checking, especially to cause the measuring system to perform—supplementally or exclusively—a self-diagnosis with on-board means, namely alone by means of the measuring transducer and connected measuring system-electronics. In order to detect the above described changes of the system functions, and, associated therewith, degradings of the ability of measuring system to function, an option in the course of a checking is, for example, to cause the vibration element by means of the exciter arrangement to execute vibrations, in given cases, also multimodal vibrations and/or even vibrations simultaneous with the wanted oscillations, and then to evaluate the oscillation signals representing the resulting oscillation responses in the measuring system-electronics, namely to examine for disturbances of the measuring system. For example, based on the oscillation signals, parameter values can be ascertained, which characterize the particular oscillatory response or one or more of the above described system functions, and such parameter values can be compared with appropriately pre-determined, reference values, for example, in order in the case of exceeding a appropriately predetermined, threshold value representing a still acceptable measure of tolerance, consequently in the case of diagnosing an error, to generate a system status-, or disturbance report correspondingly signaling such. In given cases, also a corresponding alarm can be issued. Such parameters characterizing oscillation responses can include, for example, (oscillation-)amplitude ratios or (oscillation-)frequency states. The (system-)parameters characterizing system functions can, in turn, be, for example, one or more modal bending stiffnesses, one or more modal mass distributions, or one or more modal dampings of the at least one tube. The corresponding reference values can be ascertained earlier, for example, in the course of a (first-)calibrating of the measuring system by the manufacturer in the plant or, in given cases, also in the course of a start-up of the measuring system on-site, by means of the measuring system still located in the original (reference-)state, and can be correspondingly stored in the measuring system-electronics. Oscillation forms suitable for the checking in the case of measuring systems of the type being discussed, particularly also in the case of standard measuring systems, are those natural oscillation modes of the tube, which are equally as symmetrical as the particularly established wanted mode. For example, in the case of the measuring systems discussed in U.S. Pat. Nos. 4,680,974, 5,796,010, 5,728,952, and WO-A 2017/069749, excited and evaluated for the checking are resonant oscillations of one or more symmetric oscillation modes, preferably resonant oscillations of oscillation modes of first and/or third, in given cases, also fifth order; this, for example, also in such a manner that free oscillations are evaluated, namely oscillations allowed to decay after being initially excited. Alternatively or supplementally, however, also, such as provided in, among others, US-A 2012/0123705, oscillations outside of resonance can be used for the checking, namely oscillations of the tube forced by means of the oscillation exciter correspondingly supplied with electrical current with an oscillation frequency differing from each resonant frequency of the tube by more than 1 Hz, or more than 1%, for example, in order to keep small, or to eliminate, a dependence of the system function of the measuring transducer to be checked on the measured substance conveyed therein.

Occasionally, the so obtained oscillation signals can, in spite of a disturbance being present, also only react slightly with a corresponding change of the parameters, or parameter values, characterizing oscillation responses, for example, in the case of an almost uniform, or symmetric, eroding of the vibration element, or a uniform or homogeneous accretion formation on the vibration element. This can mean a comparatively late detecting of the disturbance. Starting from the above described state of the art, an object of the invention is, consequently, so to improve vibronic measuring systems of the aforementioned type that the occurrence of disturbances, or defects, of the measuring system of the aforementioned type, such as, for instance, wear-, or aging phenomena of a measuring transducer reducing the accuracy of measurement and/or the operating safety of the measuring system can be detected as early as possible and reliably, in given cases, also signaled; this, especially, also in the case of application of the (standard-)measuring transducer established for conventional measuring systems, i.e. typical measuring transducer-design, as well as also while equally largely maintaining proven technologies and architectures of already established measuring system-electronics.

SUMMARY

For achieving the object, the invention resides in a method for checking a vibronic measuring system, especially a vibronic measuring system serving for ascertaining at least one measured variable of a flowable measured substance. The measuring system includes a measuring transducer having at least one, especially tubular, vibration element, with at least one electromechanical, especially electrodynamic, oscillation exciter for converting electrical power into mechanical power serving for exciting and maintaining forced mechanical oscillations of the vibration element and with at least one electrodynamic, first oscillation sensor for registering mechanical oscillations of the vibration element, especially its wanted oscillations, at a first oscillation measuring point, especially a first oscillation measuring point removed from the oscillation exciter, and for providing at least one, especially electrical, oscillation signal at least partially representing oscillatory movements of the vibration element, as well as a transducer-protective housing for the measuring transducer, especially a housing having a wall of a non-ferromagnetic metal. Additionally, both the at least one oscillation exciter as well as also the first oscillation sensor, as well as, at least partially, the vibration element are arranged within the transducer-protective housing. The method of the invention comprises steps as follows:

positioning a first (test-)magnet at a first test position outside of the measuring transducer, for example, externally at the transducer-protective housing, for producing a first (test-)magnetic field partially passing through the measuring transducer, for example, in the region of the vibration element and/or the first oscillation sensor;
   causing the vibration element to vibrate for producing a first test signal, namely an oscillation signal provided by the first oscillation sensor in the case of first (test-) magnet positioned at the first test position, and in the case of the first (test-)magnetic field passing through the measuring transducer;
   using the first test signal for ascertaining at least a first characterizing number value, which quantifies a first oscillation characterizing number characterizing oscillations of the vibration element;

comparing the first characterizing number value with one or more (characterizing number-)threshold values for the first oscillation characterizing number; and
detecting a disturbance of the measuring system, for example, of the measuring transducer, when the first characterizing number value exceeds a first (characterizing number-)threshold value, especially a first (characterizing number-)threshold value representing a nonintact measuring system, or when the first characterizing number value has left a first (characterizing number-)value range bounded by the first (characterizing number-)threshold value, especially a first (characterizing number-)value range representing an intact measuring system.
   In a first embodiment of the invention, it is, furthermore, provided that the positioning of the first (test-)magnet at the first test position includes a releasable securing of the first (test-)magnet on the transducer-protective housing.
   In a second embodiment of the invention, it is, furthermore, provided that the measuring transducer includes at least one electrodynamic, second oscillation sensor, for example, a second oscillation sensor embodied equally to the first oscillation sensor, for registering mechanical oscillations of the vibration element at a second oscillation measuring point, for example, a second oscillation measuring point removed from the first oscillation measuring point and/or from the oscillation exciter, and for providing at least one, for example, electrical, oscillation signal at least partially representing oscillatory movements of the vibration element, and the second oscillation sensor is arranged within the transducer-protective housing. Developing this embodiment further, it is, additionally, provided that the method further comprises causing the vibration element to vibrate for producing a second test signal, namely an oscillation signal provided by the second oscillation sensor in the case of first (test-)magnet positioned at the first test position, and in the case of the first (test-)magnetic field passing through the measuring transducer, especially for the simultaneous producing of the first and second test signals, for example, to using also the second test signal for ascertaining the first characterizing number value.
   In a third embodiment of the invention, it is, furthermore, provided that the measuring transducer includes at least one electrodynamic, second oscillation sensor, for example, a second oscillation sensor embodied equally to the first oscillation sensor, for registering mechanical oscillations of the vibration element at a second oscillation measuring point, for example, a second oscillation measuring point removed from the first oscillation measuring point and/or from the oscillation exciter, and for providing at least one, for example, electrical, oscillation signal at least partially representing oscillatory movements of the vibration element, and the second oscillation sensor is arranged within the transducer-protective housing. Developing this embodiment further, it is, additionally, provided that the method further comprises causing the vibration element to vibrate for producing both a first measurement signal, namely an oscillation signal provided by the first oscillation sensor in the case of a (test-)magnetic field not passing through the measuring transducer, equally as well in the case of vibration element contacted by measured substance, as well as also a second measurement signal, namely an oscillation signal provided by the second oscillation sensor in the case of a (test-)magnetic field not passing through the measuring transducer, equally as well in the case of vibration element contacted by measured substance, for example, in such a manner that each of the first and second measurement signals includes, in each case, a wanted component having a phase angle dependent on mass flow of the measured substance and/or having a (signal-)frequency dependent on density of the measured substance, as well as using the first and second measurement signals for ascertaining the measured value.

In a fourth embodiment of the invention, it is, furthermore, provided the vibration element is secured, especially releasably, to the transducer-protective housing, especially is set into the transducer-protective housing through a (push in-)opening. Developing this embodiment of the invention further, it is, additionally, provided that the first (characterizing number-)threshold value represents a vibration element positioned incorrectly in the transducer-protective housing and/or a vibration element secured incorrectly to the transducer-protective housing.

In a fifth embodiment of the invention, it is, furthermore, provided that the ascertaining of the at least one characterizing number value includes ascertaining a phase angle of the first test signal, for example, a phase angle of an electrical (alternating-)voltage of the first test signal.

In a sixth embodiment of the invention, it is, furthermore, provided that the ascertaining of the at least one characterizing number value includes ascertaining a (signal-)amplitude of the first test signal, for example, an amplitude of an electrical (alternating-)voltage of the first test signal.

In a seventh embodiment of the invention, it is, furthermore, provided that the ascertaining of the at least one characterizing number value includes ascertaining a (signal-)frequency of the first test signal, for example, a frequency of an electrical (alternating-)voltage of the first test signal.

In an eighth embodiment of the invention, it is, furthermore, provided that at least one (permanent-)magnet is secured on the vibration element, for example, a (permanent-)magnet formed as a component of a plunger coil partially secured on the vibration element and/or serving as (exciter-)magnet. Developing this embodiment of the invention further, it is, additionally, provided that the first test position is also so selected such that as a result of the (test-)magnetic field of the first (test-)magnet positioned at the first test position a force acts on the (permanent-)magnet secured on the vibration element.

In a ninth embodiment of the invention, it is, furthermore, provided that at least one electrical coil is secured on the vibration element, for example, an electrical coil formed as a component of a plunger coil partially secured on the vibration element and/or serving as (sensor-)coil. Developing this embodiment of the invention further, it is, additionally, provided that the first test position is so selected that the first (test-)magnetic field of the first (test-)magnet positioned at the first test position passes also partially through the (sensor-)coil, for example, in such a manner that an electrical (alternating-)voltage induced in the (sensor-)coil has an amplitude dependent on, or co-determined by, the first (test-)magnetic field.

In a tenth embodiment of the invention, it is, furthermore, provided the vibration element is formed by means of a tube, especially an at least sectionally bent tube and/or an at least sectionally straight tube.

In an eleventh embodiment of the invention, it is, furthermore, provided that the measuring system further includes a measuring system-electronics electrically coupled, for example, by means of electrical connection lines, with the measuring transducer, namely both with its oscillation exciter as well as also with its at least one oscillation sensor, namely a measuring system-electronics formed, for example, by means of at least one microprocessor and/or accommodated in an electronics-protective housing, for operating the measuring transducer and for evaluating one or more oscillation signals delivered by the measuring transducer.

In a first additional development of the invention, the method further comprises positioning the first (test-)magnet and/or a second (test-)magnet at a second test position removed from the first test position and outside of the measuring transducer, for example, externally at the transducer-protective housing, for producing a second (test-) magnetic field also partially passing through the measuring transducer, especially in the region of the vibration element.

In a first embodiment of the first additional development of the invention, it is, furthermore, provided that an imaginary connecting axis imaginarily connecting the first and second test positions extends through the oscillation exciter and/or through the first oscillation sensor.

In a second embodiment of the first additional development of the invention, the method further comprises causing the first vibration element to vibrate for producing a third test signal, namely an oscillation signal provided by the first oscillation sensor in the case of the second (test-)magnetic field passing through the measuring transducer.

In a third embodiment of the first additional development of the invention, the method further comprises using the third test signal for ascertaining at least a second characterizing number value, which quantifies a second oscillation characterizing number characterizing oscillations of the vibration element. Developing this embodiment further, it is, additionally, provided that the method further comprises comparing the second characterizing number value with one or more (characterizing number-)threshold values earlier ascertained for the second oscillation characterizing number, for example, also detecting a disturbance of the measuring transducer, or of the measuring system formed therewith, for example, when the second characterizing number value exceeds a second (characterizing number-)threshold value representing a non-intact measuring system, or has left a second (characterizing number-)value range bounded by the second (characterizing number-)threshold value and representing an intact measuring system.

In a second additional development of the invention, the method further comprises causing a measured substance to flow through the measuring transducer, for example, in such a manner that the vibrating vibration element is contacted by measured substance, especially is flowed through by measured substance, and/or that the oscillatory signal provided by the first oscillation sensor has a phase angle dependent on mass flow of the measured substance and/or a (signal-) frequency dependent on density of the measured substance.

In a first embodiment of the second additional development of the invention, the method further comprises causing the first vibration element to vibrate for producing a first measurement signal, namely an oscillation signal provided by the first oscillation sensor in the case of a (test-)magnetic field not passing through the measuring transducer, equally as well in the case of first vibration element contacted by measured substance, for example, in such a manner that the oscillatory signal provided by the first oscillation sensor has a wanted component with a phase angle dependent on mass flow of the measured substance and/or a (signal-)frequency dependent on density of the measured substance, as well as using the first measurement signal for ascertaining a measured value for a measured variable, especially a substance parameter or a flow parameter, of the measured substance flowing through the measuring transducer, especially only for the case, in which the first characterizing number value has not exceeded the predetermined, first (characterizing number-)threshold value, and has not left the first (characterizing number-)value range.

In a second embodiment of the second additional development of the invention, the method further comprises using the first measurement signal for ascertaining at least one (signal-)parameter value for a signal parameter characterizing the first measurement signal, especially a phase angle, a (signal-)frequency or a (signal-)amplitude of the first measurement signal, as well as using the at least one (signal-) parameter value for the signal parameter characterizing the first measurement signal for ascertaining the at least one measured value.

In a third additional development of the invention, the method further comprises removing the first (test-)magnet from the measuring transducer for ending the checking of the measuring system, especially in such a manner that the first (test-)magnetic field no longer passes through the measuring transducer.

In a fourth additional development of the invention, the method further comprises using the first test signal for ascertaining at least one parameter value for a signal parameter characterizing the first test signal, especially a phase angle, a (signal-)frequency or a (signal-)amplitude of the first test signal. In an embodiment of the fourth additional development of the invention, the method further comprises using the parameter value for the signal parameter characterizing the first test signal for ascertaining the first characterizing number value, especially in such a manner that the parameter value and/or a calculated value ascertained therewith serves as characterizing number value.

In a fifth additional development of the invention, the method further comprises producing an electrical (exciter-) power in the electrical driver signal feeding the at least one oscillation exciter for causing the vibration element to vibrate. In an embodiment of the fifth additional development of the invention, the method further comprises using the driver signal for ascertaining at least one parameter value for a signal parameter characterizing the driver signal, for example, a phase angle, a (signal-)frequency or a (signal-) amplitude of the driver signal, especially also using the parameter value for which signal parameter characterizing the driver signal for ascertaining the first characterizing number value.

A basic idea of the invention is to use at least one (test-)magnet positioned externally at the measuring transducer and a (test-)magnetic field established therewith in the measuring transducer for temporarily, intentionally, changing at least one system function (transfer function) of the measuring transducer, for example, by influencing the at least one oscillation sensor or by influencing oscillatory movements of the vibration element, as well as to generate one or more oscillation signals with the measuring transducer while it is under the influence of the (test-)magnetic field. By comparison of the so obtained oscillatory response with an earlier ascertained, reference-oscillatory response for a measuring transducer likewise exposed to the (test-) magnetic field, for instance, in the manufacturer's plant and/or at start-up of the measuring system, it can then be very easily ascertained, whether, and to what extent, a disturbance of the measuring transducer, or of the measuring system formed therewith is present. By the influence of the (test-)magnetic field, for example, even possibly present, but small, changes of the system functioning can be amplified and, thus, better detected. Consequently, even disturbances that are just starting to grow can be detected early.

The invention as well as advantageous embodiments thereof will now be explained in greater detail based on examples of embodiments displayed in the figures of the drawing. Equal, or equally acting or equally functioning, parts are provided in all figures with equal reference characters; when perspicuity requires or it otherwise appears sensible, reference characters already displayed in earlier figures are omitted in subsequent figures. Other advantageous embodiments or additional developments, especially also combinations of, firstly, only individually explained aspects of the invention, result, furthermore, from the figures of the drawing and/or from the claims per se.

DETAILED DESCRIPTION

Figure 1:
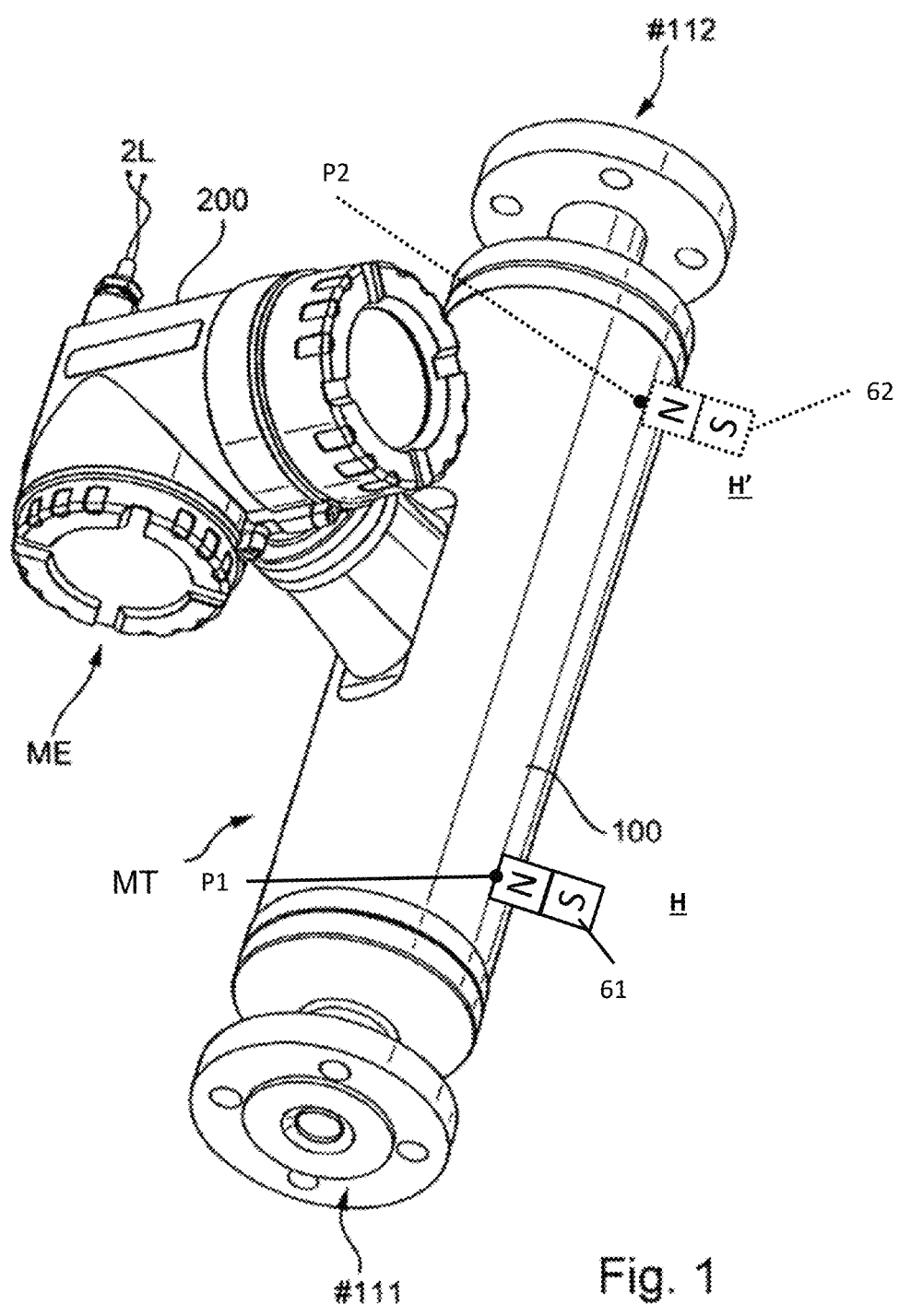
FIG. 1 shows perspectively, a vibronic measuring system with a (test-) magnet positioned in its vicinity.
Figure 2:
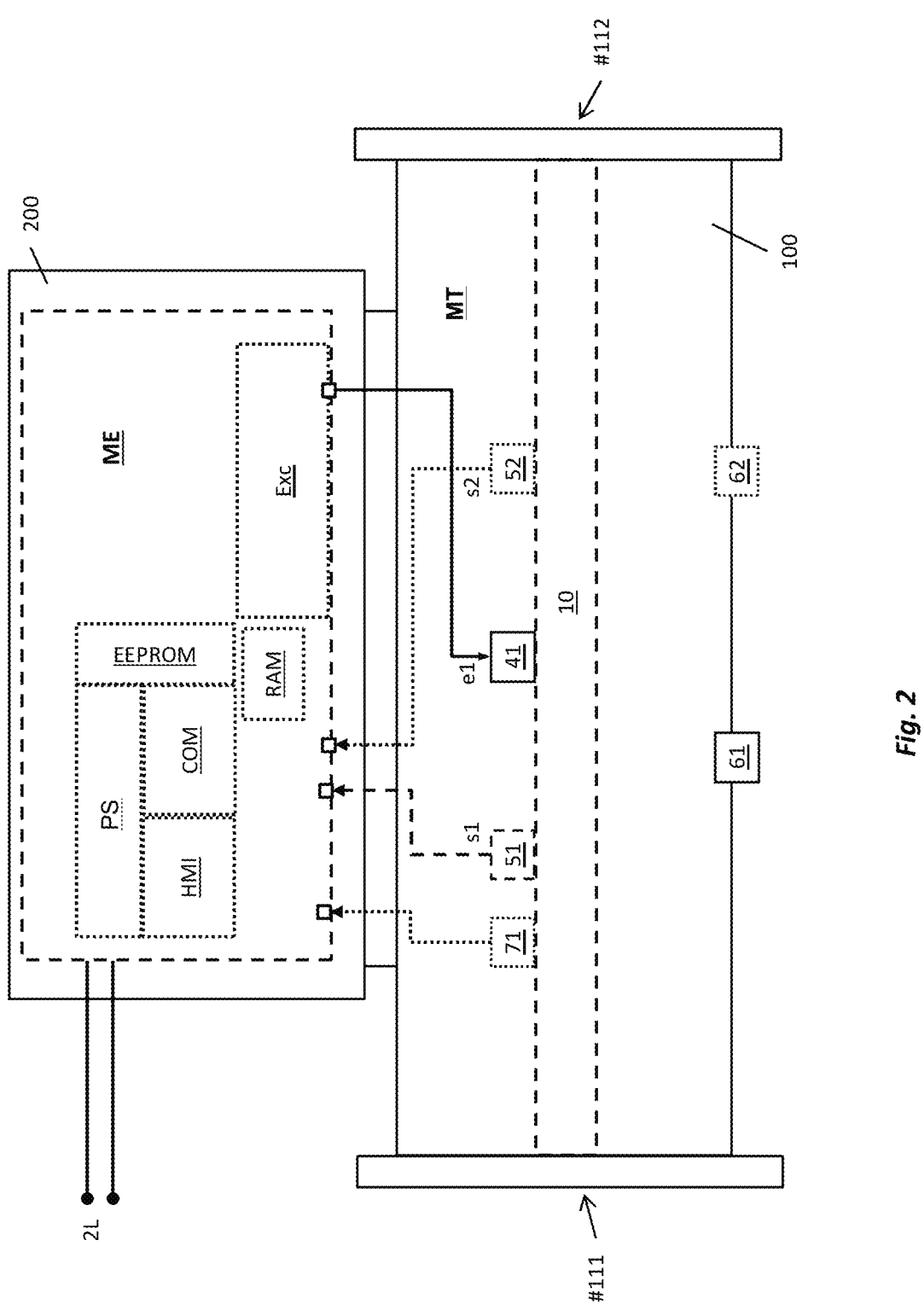
FIG. 2 shows schematically, a measuring transducer of vibration-type and a measuring system-electronics of a measuring system as in FIG. 1.

Shown in FIGS. 1 and 2 is a vibronic measuring system insertable into a process line (not shown)—such as e.g. a pipeline of an industrial plant, for example, a bottling plant or a fueling facility—for measuring flowable, especially fluid, or pourable, substances, for example, even an at least at times inhomogeneous fluid, for example a two- or multiphase fluid. The measuring system serves, especially, for measuring and/or monitoring a mass flow m, e.g. ascertaining mass flow-measured values representing mass flow of a fluid measured substance, for example, a gas, a liquid or a dispersion, conveyed or allowed to flow, at least at times, in the above mentioned process line. Furthermore, the measuring system can serve, alternatively or supplementally, also to measure density p and/or viscosity η of the measured substance, for example, to ascertain and to output density-measured values representing density and/or viscosity-measured values representing viscosity. In an embodiment of the invention, it is provided to use the measuring system for ascertaining mass flow-measured values of a measured substance to be transferred, for example, in a predetermined, or predeterminable, amount from a supplier to a customer, for example, in the form of a liquefied gas, such as, liquefied gas containing e.g. methane and/or ethane and/or propane and/or butane, or a liquefied natural gas (LNG) or a mixture formed by means of liquid hydrocarbons, for example, a petroleum or a liquid fuel. The measuring system can be embodied, accordingly, for example, also as a component of a transfer site for legally regulated traffic in goods, such as, for instance, a filling plant, and/or as a component of a transfer site exemplified in WO-A 02/060805, WO-A 2008/013545, WO-A 2010/099276, WO-A 2014/151829, or WO-A 2016/058745. The measuring system—for example, implemented as a Coriolis-mass flow-measuring device or as a Coriolis-mass flow-/density measuring device supplementally measuring density and/or as a Coriolis-mass flow-/viscosity-measuring device supplementally measuring viscosity—comprises a physical to electrical measuring transducer MT inserted in a process line via an inlet end

111 as well as an outlet end #112 and adapted during operation to be flowed through by the measured substance.

The measuring transducer MT is a vibration-type measuring transducer, namely a measuring transducer having at least one vibration element 10, at least one electromechanical-, for example, electrodynamic or electromagnetic, oscillation exciter 41 for exciting and maintaining mechanical oscillations of the at least one vibration element 10, and an electrodynamic, first oscillation sensor 51; this, especially, in such a manner that—such as quite usual in the case of measuring transducers of vibration-type, and vibronic measuring systems formed therewith—secured on the vibration element is at least one electrical coil, for example, an electrical coil embodied as a component of a plunger coil secured partially on the vibration element, and/or at least one permanent magnet, for example, a permanent magnet embodied as a component of a plunger coil secured partially on the vibration element.

The at least one vibration element 10 is, additionally, adapted to be contacted by flowing measured substance, for example, to be flowed through and/or around by measured substance, and during that to be caused to vibrate, for example, with at least one resonant frequency possessed by the vibration element, or the measuring transducer formed therewith. The vibration element 10 can—such as usual in the case of measuring transducers of the type being discussed, and vibronic measuring system formed therewith —, be formed, for example, by means of an, especially at least sectionally straight and/or at least sectionally circularly bent, (measuring-)tube having a tube wall, especially a tube wall of metal, and a lumen surrounded thereby, wherein the (measuring-)tube is, additionally, adapted to convey the fluid measured substance flowing at least at times, and thus to be flowed through by the measured substance, and during that correspondingly to be caused to vibrate. The vibration element 10 can, for example, however, also be formed by means of a displacement element placed within a lumen of a tube of the measuring transducer flowed through by the measured substance, wherein the displacement element is adapted to be flowed around by measured substance and during that correspondingly to be caused to vibrate. Moreover, the measuring transducer can have one or more other vibration elements, for example, also equally constructed vibration elements, which can likewise be adapted to be contacted by measured substance and during that to be caused to vibrate.

The at least one oscillation sensor 51 is, in turn, adapted to register mechanical oscillations of the at least one vibration element 10 at a first oscillation measuring point, for example, a first oscillation measuring point removed from the oscillation exciter 41, and to provide an electrical oscillatory signal s1 at least partially representing oscillatory movements of the vibration element 10, and the at least one oscillation exciter 41 is adapted to convert electrical power supplied to it into mechanical power effecting forced mechanical oscillations of the at least one vibration element 10. In an additional embodiment of the invention, the at least one oscillation exciter 41, for example, embodied as an electrodynamic, electromagnetic or piezoelectric oscillation exciter,-, as well as also indicated in FIG. 2 and quite usual in the case of measuring transducers of vibration-type, and vibronic measuring systems formed therewith—is so positioned that a force generated therewith acts on the vibration element 10 in the direction of an imaginary force action line extending through a center of mass of the at least one vibration element, and/or that the oscillation exciter 41—, as well as also shown in FIG. 2—is the only oscillation exciter effecting oscillations of the vibration element 10. In an additional embodiment of the invention, the oscillation exciter includes an electrical (exciter-) coil, for example, embodied as a component of a plunger coil secured partially on the vibration element and/or secured on the vibration element, and/or an (exciter-) magnet, for example, embodied as a component of the aforementioned plunger coil, or secured on the vibration element.

The at least one vibration element 10 is —, as well as also indicated in FIG. 2, or directly evident from a combination of FIGS. 1 and 2—at least partially, for example, also completely, accommodated within a transducer-protective housing 100 of the measuring system, and, indeed, along with the at least one oscillation exciter 41 and the one or more oscillation sensors 51, 52, in given cases, also with additional components of the measuring transducer MT; this especially in such a manner that the at least one vibration element 10 is held on the transducer-protective housing 100, for example, is connected rigidly with the transducer-protective housing 100. In an additional embodiment of the invention, the transducer-protective housing 100 has a wall of a non-ferromagnetic metal, for example, a stainless steel, and/or the vibration element 10 is secured, for example, releasably, to the transducer-protective housing. In an additional embodiment of the invention, it is, furthermore, provided that the vibration element is set into the transducer-protective housing through a (push in-)opening, for example, an opening in the wall, and can be correspondingly removed from the transducer-protective housing.

The measuring transducer MT can be, for example, a conventional vibration-type measuring transducer—for example, one known from the above mentioned EP-A 816 807, US-A 2002/0033043, US-A 2006/0096390, US-A 2007/0062309, US-A 2007/0119264, US-A 2008/0011101, US-A 2008/0047362, US-A 2008/0190195, US-A 2008/ 0250871, US-A 2010/0005887, US-A 2010/0011882, US-A 2010/0257943, US-A 2011/0161017, US-A 2011/0178738, US-A 2011/0219872, US-A 2011/0265580, US-A 2011/ 0271756, US-A 2012/0123705, US-A 2013/0042700, US-A 2016/0313162, US-A 2017/0261474, U.S. Pat. Nos. 4,491, 009, 4,756,198, 4,777,833, 4,801,897, 4,876,898, U.S. Pat. Nos. 4,996,871, 5,009,109, 5,287,754, 5,291,792, 5,349, 872, 5,705,754, 5,796,010, 5,796,011, 5,804,742, 5,831,178, 5,945,609, 5,965,824, 6,006,609, 6,092,429, 6,223,605, 6,311,136, 6,477,901, 6,505,518, 6,513,393, 6,651,513, 6,666,098, 6,711,958, 6,840,109, 6,920,798, 7,017,424, 7,040,181, 7,077,014, 7,200,503, 7,216,549, 7,296,484, 7,325,462, 7,360,451, 7,792,646, 7,954,388, 8,333,120, 8,695,436, WO-A 00/19175, WO-A 00/34748, WO-A 01/02816, WO-A 01/71291, WO-A 02/060805, WO-A 2005/ 093381, WO-A 2007/043996, WO-A 2008/013545, WO-A 2008/059262, WO-A 2010/099276, WO-A 2013/092104, WO-A 2014/151829, WO-A 2016/058745, WO-A 2017/ 069749, WO-A 2017/123214, WO-A 2017/143579, WO-A 85/05677, WO-A 88/02853, WO-A 89/00679, WO-A 94/21999, WO-A 95/03528, WO-A 95/16897, WO-A 95/29385, WO-A 98/02725, WO-A 99/40 394 or PCT/ EP2017/067826. Particularly for the above described case, in which the measuring system is embodied as a Coriolis-mass flow-measuring device, the measuring transducer can include, furthermore, at least one, electrodynamic, second oscillation sensor 52, for example, a second oscillation sensor embodied equally to the oscillation sensor 51, adapted to register mechanical oscillations of the at least one vibration element 10 at a second oscillation measuring point, especially a second oscillation measuring point removed from the first oscillation measuring point and/or from the oscillation exciter, and to provide at least one electrical oscillatory signal representing, at least partially, oscillatory movements of the vibration element 10.

The measuring system can include, furthermore, a measuring system-electronics ME electrically coupled with the measuring transducer, namely electrically coupled both with the oscillation exciter 41 as well as also with the one or more oscillation sensors 51—especially a measuring system-electronics formed by means of at least one microprocessor and/or supplied during operation with electrical energy by means of an internal energy storer and/or externally via a connection cable. The electrical coupling, or connecting, of the measuring transducer MT with the measuring system-electronics ME can occur by means of corresponding electrical connection lines and corresponding electrical cable glands. The connection lines can, in such case, at least partially, be embodied as electrically conductive wires surrounded, at least sectionally, by electrical insulation, e.g. electrically conductive wires in the form of "twisted pair-"-lines, flat ribbon cables and/or coaxial cables. Alternatively thereto or in supplementation thereof, the connection lines can at least sectionally also be formed by means of conductive traces of a circuit board, in given cases, especially a flexible circuit board. In advantageous manner, the measuring system-electronics ME, for example, a programmable and/or remotely parameterable, measuring system-electronics ME, can, furthermore, be so designed that during operation of the measuring system it can exchange with a superordinated, electronic data processing system (not shown), for example, a programmable logic controller (PLC), a personal computer and/or a work station, via a data transmission system, for example, a fieldbus system and/or wirelessly by radio, measuring—and/or other operating data, for example, also status reports, such as, for instance, current measured values or setting- and/or diagnostic values serving for control of the measuring system. Accordingly, the measuring system-electronics ME can include, for example, a transmitting—and receiving electronics COM, which during operation is fed by a (central) evaluation—and supply unit provided in the data processing system and removed from the measuring system. For example, the measuring system-electronics ME (especially its transmitting—and receiving electronics COM) can be so embodied that it is electrically connectable to the above described remote electronic data processing system via a two-conductor connection 2L configured, in given cases, as a 4-20 mA-electrical current loop and via such can both draw from the above described evaluation- and supply unit of the data processing system the electrical power required for operation of the measuring system as well as also transmit measured values to the data processing system, for example, by (load-)modulation of a direct current supply fed from the evaluation- and supply unit. Additionally, the measuring system-electronics ME can also be so embodied that it can be operated nominally with a maximum power of 1 W or less and/or is intrinsically safe. The measuring system-electronics 20 can, additionally, for example, also be modularly constructed, in such a manner that diverse electronic components of the measuring system-electronics ME, such as, for instance, a drive electronics Exc for operating the measuring transducer, a measurement- and control electronics DSV for processing measurement signals provided by the measuring transducer and for ascertaining measured values based on measurement signals of the measuring transducer, an internal power supply circuit PS for providing one or more internal operating voltages and/or the above-mentioned transmitting- and receiving electronics COM serving for communication with a superordinated measurement data processor system, or an external fieldbus, are, in each case, arranged on a suitable circuit board and/or, in each case, formed by means of a suitable microprocessor. For visualizing measuring system internally produced measured values and/or measuring system internally generated status reports, such as, for instance, an error report or an alarm, on-site, the measuring system can, furthermore, include a display- and operating element HMI communicating, at least at times, with the measuring system-electronics 20, for example, its above-mentioned measuring- and control electronics DSV, such as, for instance, a display—and operating element HMI composed of an LCD-, OLED- or TFT display placed in the aforementioned electronics-protective housing 200 behind a window correspondingly provided therein, as well as a corresponding input keypad and/or a touch screen. Thus, for protecting the measuring system-electronics ME, the measuring system can include, additionally, a, for example, also modular, electronics-protective housing 200 and the measuring system-electronics ME can be accommodated, at least partially, in given cases, also completely, within the electronics-protective housing 200. The electronics-protective housing 200, or a particular housing-module thereof, can be composed, for example, of a metal, for instance, stainless steel or aluminum, and/or be made by means of a casting method, such as e.g. an investment casting—or a pressure casting method (HPDC); it can, however, for example, also be formed by means of a plastic cast part produced in an injection molding method. Moreover, the electronics-protective housing 200, or the above described housing-modules, can also be embodied impact—, or pressure resistantly and/or protectively against penetration of dust in damaging amounts and/or water spray from all sides, for example, also in such a manner that it satisfies the requirements of protection type IP 54 according to DIN EN 60529 (VDE 0470-1):2014-09 and/or the requirements of ignition protection type "pressure resistant encapsulation (Ex d-)" according to EN 60079-1:2007. Additionally, for example, the above-mentioned electronics-protective housing 200 can—, as well as also shown in FIGS. 1 and 2—be mounted on the transducer-protective housing 100 to form a flow-measuring device, for example, a Coriolis-mass flow-measuring device, in compact construction.

The measuring system-electronics ME can, among other things, also be provided and correspondingly adapted to generate an electrical driver signal e1 —, for example, a bipolar electrical driver signal and/or an, at least at times, periodic, electrical driver signal, in given cases, also a harmonic electrical driver signal—and therewith to supply electrical (exciter-)power to the at least one oscillation exciter 41, in such a manner that the at least one vibration element 10 executes, at least partially, wanted oscillations, namely forced mechanical oscillations having a wanted frequency $f_N$, which are suitable to produce in the flowing measured substance reaction forces reacting on the vibration element and dependent on one or more measured variables, for example, on mass flow and/or density. In an additional embodiment of the invention, the wanted oscillations are, especially, suitable to produce Coriolis forces reacting on the vibration element 10 and dependent on mass flow, in such a manner that superimposed on the wanted oscillations are Coriolis oscillations, namely mechanical oscillations with the wanted frequency $f_N$, supplementally forced by the Coriolis forces and dependent on mass flow m of the measured substance. The wanted frequency $f_N$ is an oscillation frequency of the forced mechanical oscillations of the vibration element ($f_N=f_R$) predetermined by the electrical driver signal e1 corresponding, for example, to the above described resonant frequency $f_R$ of the measuring transducer. The driver signal e1 can, accordingly, be, for example, a harmonic electrical signal forming the above-mentioned signal component e1$_N$ determining the wanted frequency $f_N$ or, for example, also a multi-frequency electrical signal composed of a plurality of (spectral) signal components, equally as well containing a spectral wanted component e1$_N$ determining the wanted frequency $f_N$. The wanted oscillations excited by means of oscillation exciter 41 and measuring system-electronics ME connected thereto can be, furthermore, for example, bending oscillations of the at least one vibration element 10 about an associated rest position, wherein selected as wanted frequency $f_N$, namely set by means of the driver signal e1, can be, for example, an instantaneous resonant frequency of a bending oscillation fundamental mode of the at least one vibration element 10 having only a single oscillatory antinode and dependent also on the density and/or viscosity of the measured substance conveyed in the measuring transducer and contacting its vibration element 10 and/or a lowest instantaneous resonant frequency of the at least one vibration element 10. For producing the driver signal e1, thus to set the wanted frequency $f_N$, the measuring system-electronics ME can have, for example, a corresponding drive electronics Exc, especially a drive electronics formed by means of one or more phase control loops (PLL—phase locked loop) serving for ascertaining and setting the wanted frequency $f_N$. In an additional embodiment of the invention, the drive electronics Exc has a digital frequency output. Additionally, the drive electronics Exc is, furthermore, also adapted to output on the frequency output a frequency sequence, namely a sequence of the signal frequency set for the driver signal e1, for example, digital frequency values quantifying the instantaneously set wanted frequency (or the signal frequency of its signal component eN1).

As already mentioned, the measuring transducer MT is, furthermore, also equipped with one or more electrodynamic oscillation sensors 51, 52, in order to register mechanical oscillations of the at least one vibration element 10, particularly also forced mechanical oscillations of the at least one vibration element 10, i.e. its wanted oscillations, at a first oscillation measuring point, especially a first oscillation measuring point removed from the oscillation exciter 41, and to provide an electrical oscillatory signal s1 representing, at least partially, oscillatory movements of the vibration element 10. Especially, the at least one oscillation sensor 51 is provided, at least in the normal (measuring-) operation of the measuring system, to provide an oscillatory signal s1 serving as a first measurement signal m1 (s1→m1), namely an oscillatory signal generated in the case of vibrating vibration element contacted by measured substance; this, especially, in such a manner that—, as well as also indicated in FIG. 3—the oscillatory signal s1 has at least a (time t dependent) first wanted component s1$_N$, namely an alternating voltage component having a (signal-) frequency corresponding to the wanted frequency $f_N$; this, for example, in such a manner that the (signal-) frequency is dependent on the density of the measured substance and/or that the wanted component s1$_N$ has a phase angle dependent on mass flow of the measured substance. Analogously thereto, also the above-mentioned oscillation sensor 52 can correspondingly be adapted to register oscillatory movements of the at least one vibration element at a second oscillation measuring point removed from the first oscillation measuring point and correspondingly to transduce such into an electrical, second oscillatory signal s2 of the measuring transducer (s2→m2) serving in normal (measuring-) operation of the measuring system as a measurement signal m2; especially in such a manner that—, as well as also indicated in FIG. 3—the oscillatory signal s2 has at least one (time t dependent), second wanted component s2$_N$, namely an alternating voltage component having a frequency corresponding to the wanted frequency $f_N$. Since the oscillation sensor 51, and the oscillation sensors 51, 52, are electrodynamic oscillation sensors, accordingly, the wanted component s1$_N$ has an amplitude U1$_N$ (voltage level) dependent on the wanted frequency $f_N$ as well as on a first magnetic flux $\Phi 1$, namely a magnetic flux of the oscillation sensor 51, and the wanted component s2$_N$ has an amplitude U2$_N$ (voltage level) dependent on the wanted frequency $f_N$ as well as on a second magnetic flux $\Phi 2$, namely a magnetic flux of the oscillation sensor 52.

Figures 3A, 3B:
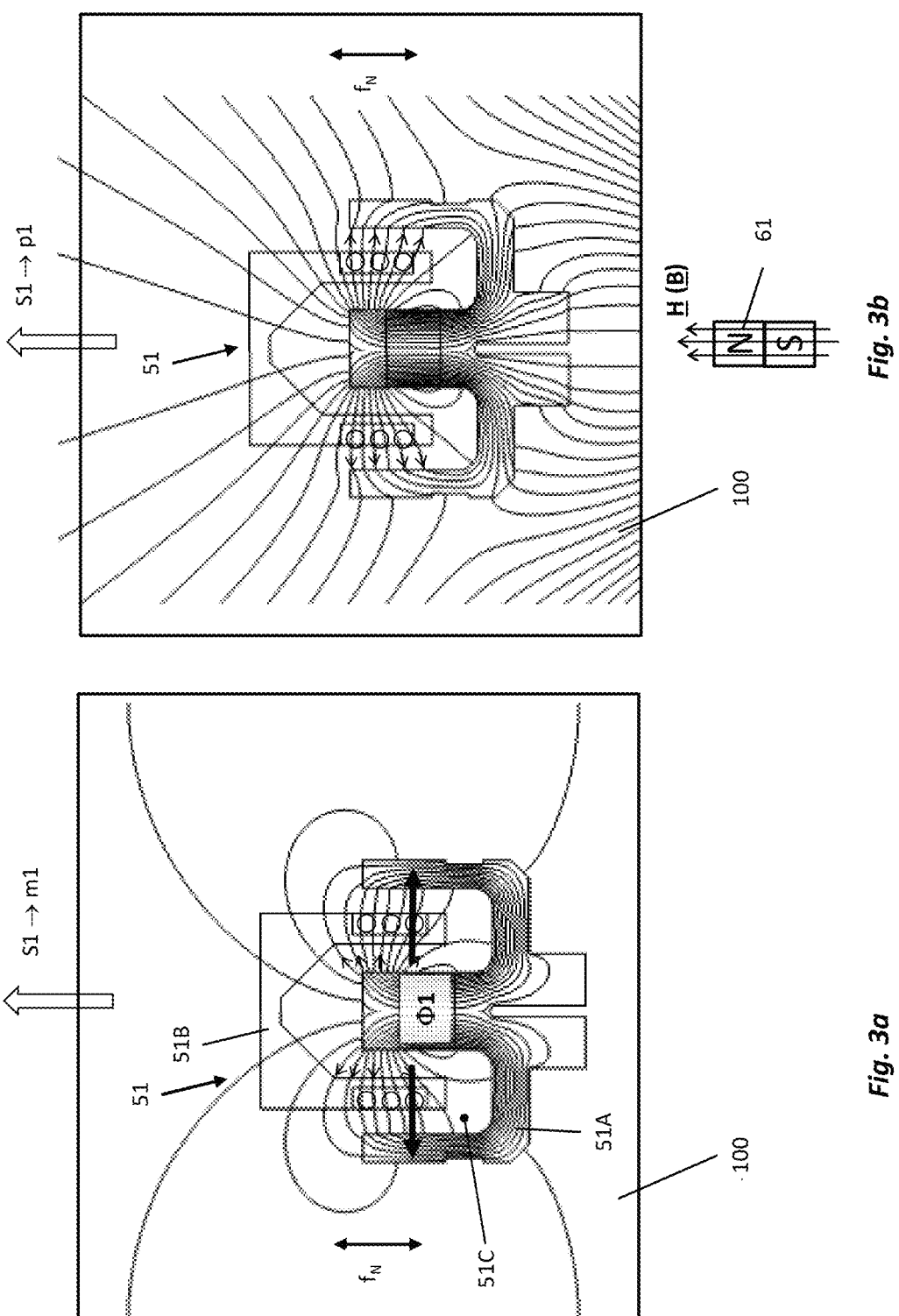
FIG. 3a shows schematically, an oscillation sensor suitable for a measuring transducer of FIG. 2.
FIG. 3b shows an oscillation sensor as in FIG. 3a with a test magnetic field of a (test-)magnet passing through it.

Each of the one or more oscillation sensors 51 (51, 52) can, such as shown schematically in FIGS. 3a and 3b and as quite usual in the case of measuring transducers of the type being discussed, be formed, for example, by means of a plunger coil. Accordingly, in an additional embodiment of the invention, it is, furthermore, provided that the oscillation sensor 51 has a permanent magnet serving as sensor-magnet connected mechanically, for example, with the at least one vibration element, to form the first oscillation measuring point, as well as an air coil serving as a sensor-coil connected mechanically, for example, with the at least one vibration element 10 and/or with the transducer-protective housing 100. Equally, also the second oscillation sensor can have a permanent magnet serving as a sensor-magnet connected mechanically, for example, with the at least one vibration element 10 to form the second oscillation measuring point, as well as an air coil serving as a sensor-coil connected mechanically, for example, with the at least one vibration element and/or with the transducer-protective housing 100. The sensor-, or permanent magnet of the oscillation sensor 51 forms a (first) air gap containing the magnetic flux $\Phi 1$, in which the sensor-, or air coil of the oscillation sensor 51 is, at least partially, positioned. Correspondingly, the sensor-, or permanent magnet of the oscillation sensor 52 can form a (second) air gap containing the magnetic flux $\Phi 2$, in which the sensor-, or air coil of the oscillation sensor 52 is, at least partially, positioned. Furthermore, the sensor-magnet and the sensor-coil of the oscillation sensor 51 can be adapted to be moved relative to one another by oscillatory movements of the at least one vibration element and to generate a first induced voltage ($u_{i1}$) serving as oscillatory signal s1, namely an electrical (alternating-) voltage induced in the sensor coil of the oscillation sensor 51. Equally, also the sensor magnet and the sensor coil of the oscillation sensor 52 can be adapted to be moved relative to one another by oscillatory movements of the at least one vibration element 10 and to generate a second induced voltage ($u_{i2}$) serving as oscillatory signal s2, for example, in such a manner that the above described, first and second induced voltages, corresponding to the law of induction (for movement induction):

$$u_{i1} = \frac{d\Psi 1}{dt} \sim N1 \cdot \Phi 1 \cdot 2\pi \cdot f_N \cdot \cos(2\pi \cdot f_N \cdot t) \to s1, \text{ or}$$

$$u_{i2} = \frac{d\Psi 2}{dt} \sim N2 \cdot \Phi 2 \cdot 2\pi \cdot f_N \cdot \cos(2\pi \cdot f_N \cdot t) \to s2$$

in each case, depend on a flux linkage-, or induction flux, ($\Psi 1 = N1 \cdot \Phi 1$, $\Psi 2 = N2 \cdot \Phi 2$), namely a total magnetic flux within a sensor coil, consequently on the magnetic flux $\Phi 1$, $\Phi 2$ and an associated number of turns (N1, N2). The oscillation signals generated by the measuring transducer 10 are then supplied to the measuring system-electronics ME, for example, via electrical connection lines, in order, for example, to be correspondingly processed by means of digital signal processing (DSP), for example, preamplified, filtered and digitized and thereafter correspondingly evaluated.

For the above described case, in which at least two oscillation sensors 51, 52 are provided, in an additional embodiment of the invention, these are, additionally, so arranged that in the case of an exciting of the above described Coriolis oscillations of the at least one vibration element 10, each of the wanted components $s1_N$, $s2_N$ of the oscillation signals s1, s2 has, additionally, in each case, also a phase angle dependent on mass flow m of the measured substance flowing through the measuring transducer 10, for example, measurable relative to the driver signal e1, or its wanted component $e1_N$; this, especially, in such a manner that, as well as also indicated in FIG. 3, there exists between the wanted component $s1_N$ of the oscillation signal s1 and the wanted component $s2_N$ of the oscillation signal s2 a phase difference $\Delta \varphi 12$ ($\Delta \varphi 12 = f(m)$) dependent on mass flow m, namely a difference between the phase angle of the first wanted component $s1_N$ and the phase angle of the second wanted component $s2_N$, and the oscillation signals s1, s2 follows a change of the mass flow of the measured substance conveyed in the measuring transducer with a change of the phase difference $\Delta \varphi 12$ ($\Delta \varphi 12^*$). The oscillation sensors 51, 52 can, such as quite usual with measuring transducers of the type being discussed, and also indicated in FIG. 2, accordingly, be positioned, for example, in each case, with the same separation from a center of mass of the at least one vibration element 10, for example, thus, from the center of mass of the at least one tube, or from the center of mass of the at least one displacement element, in such a manner that seen in the flow direction the oscillation sensor 51 is arranged on the inlet side of the at least one vibration element 10, or in its vicinity, and the oscillation sensor 52 is arranged on the outlet side of the at least one vibration element 10, or in its vicinity. Additionally, the two oscillation sensors 51, 52 can also be the only oscillation sensors serving for registering oscillations of the at least one vibration element 10, in such a manner that the measuring transducer has except for the oscillation sensors 51, 52 no additional oscillation sensors. In an additional embodiment of the invention, it is, furthermore, provided that the measuring transducer includes at least one temperature sensor 71 for registering temperature of the measuring transducer at a temperature-measuring point. Temperature sensor 71 is adapted to provide a temperature measurement signal, namely a measurement signal representing temperature at the temperature-measuring point, especially a measurement signal having an electrical voltage dependent on the temperature and/or an electrical current dependent on the temperature. Alternatively or supplementally, the measuring transducer can, for example, also have at least one strain sensor serving for registering mechanical stresses within the measuring transducer and providing a corresponding strain measurement signal and/or one or more magnetic field sensors serving for registering magnetic fields, in given cases, also disturbing magnetic fields, within the measuring transducer and, in each case, providing a corresponding magnetic field measurement signal.

The measuring system-electronics ME can, such as already mentioned, in addition to production of the driver signal e1, furthermore, also be provided and adapted to receive and to evaluate the oscillation signals s1, s2, namely based on the oscillation signals s1, s2, for example, based on the above described phase difference $\Delta \varphi 12$ between the first and second wanted components, to ascertain mass flow-measured values representing the mass flow, for example, also to output such in the form of analog values and/or digital values. Accordingly, the measuring system-electronics 20 can, furthermore, also be adapted, based on the oscillation signals s1, s2, firstly, to ascertain the phase difference $\Delta \varphi 12$. Additionally, the measuring system-electronics ME can also be adapted to ascertain from at least one of the present oscillation signals s1, s2 the above-mentioned phase angle of its wanted component $s1_N$, $s2_N$, for example, relative to the driver signal e1, or its above referenced wanted component $e1_N$, and/or based on at least one of the oscillation signals s1, s2 to ascertain the wanted frequency $f_N$, for example, also during operation to generate at least one phase sequence, namely a sequence of digital phase values correspondingly quantifying the phase angle of one of the first and second wanted components, and/or a frequency sequence, namely a sequence of digital frequency values quantifying the wanted frequency $f_N$, in such a manner that the phase sequence corresponds to phase angle of the corresponding wanted component as a function of time, and the frequency sequence corresponds to the wanted frequency as a function of time. The ascertaining of the phase angle, or the generating of the above described phase sequence, can be implemented, for example, such as quite usual in the case of Coriolis-mass flow-measuring devices, by means of a quadrature demodulation (Q/I-demodulation) of the oscillation signal correspondingly performed in the measuring system-electronics ME using a first harmonic reference signal (Q) with the wanted frequency and a second harmonic reference signal (I) phase-shifted therefrom by 90°. For such purpose, the measuring system-electronics ME can, furthermore, be adapted, based on the oscillation signal s1, to generate a first wanted component sequence, namely a sequence of digital amplitude values $U1_{N1}[m]$ ($m \in N$-natural numbers) quantifying the amplitude $U1_{N1}$ of the first wanted component $s1_N$ and the measuring system-electronics can, additionally, be adapted, based on the oscillation signal s2, to generate a second wanted component sequence, namely a sequence of digital amplitude values $U2_{N1}[n]$ ($n \in N$) quantifying the amplitude $U2_N$ of the second wanted component $s2_N$, for example, in such a manner that the amplitude values $U1_{N1}[m]$ are ascertained at equidistantly successive points in time $t_m = m \cdot T_{s1}$, consequently with a refresh rate $f_{s1} = 1/(t_{m+1} - t_m) = 1/T_{s1}$, and the amplitude values $U2_N[n]$ are ascertained at equidistantly successive points in time to $= n \cdot T_{s2}$, consequently with a refresh rate $f_{s2} = 1/(t_{n+1} - t_n) = 1/T_{s2}$, in such a manner that the first wanted component sequence at least approximately corresponds to an amplitude $U1_N$ of the first wanted component $s1_N$ as a function of time, and the second wanted component sequence at least approximately corresponds to an amplitude $U2_{N1}$ of the second wanted component $s2_N$ as a function of time. These updating rates $f_{s1}$, $f_{s2}$ can, for example, be so selected that they are equally large ($f_{s1} = f_{s2}$) and/or that an amplitude value $U1_{N1}[m]$ is ascertained essentially at the same time as a corresponding amplitude value $U2_{N1}[n]$ ($t_m = t_n$).

Particularly for the mentioned case, in which the wanted oscillations effected by means of the driver signal e1 are resonant oscillations of the at least one vibration element 10, the wanted frequency $f_N$ of the oscillation signals s1, s2 can serve for measuring density and/or viscosity of the measured substance and, accordingly, by means of the measuring system-electronics ME the density and/or viscosity can be ascertained based on the above described frequency sequence. Particularly for the above described case, in which the measuring transducer includes a temperature sensor 71 and/or a strain sensor, the measuring system-electronics 20 in an additional embodiment of the invention is, furthermore, also adapted to receive and to process the temperature measurement signal generated by the temperature sensor, and to receive and to process the strain measurement signal generated by the strain sensor, especially to digitize and to evaluate them; this, for example, in such a manner that the measuring system-electronics ME based on the at least one temperature measurement signal ascertains temperature of the displacement element and/or temperature of the measured substance.

For processing the oscillation signals s1, s2 delivered from the measuring transducer, in given cases, also the above described temperature- and/or strain- and/or magnetic field measurement signals, for example, for ascertaining the mass flow-measured values and, in given cases, also for ascertaining the density-measured values and/or viscosity-measured values, the measuring system-electronics ME can, such as already indicated, have, furthermore, a corresponding measuring- and control electronics DSV, which, such as shown schematically in FIG. 2, is electrically connected with the measuring transducer 10, including its one or more oscillation sensors 51, 52, for example, in such a manner that formed by the measuring- and control electronics DSV are a first measurement signal input of the measuring system-electronics ME for the oscillatory signal s1 as well as at least a second measurement signal input of the measuring system-electronics 20 for the oscillatory signal s2. The measuring- and control electronics DSV can advantageously be adapted to process the supplied oscillation signals s1, s2, and, in given cases, also the temperature- and/or strain measurement signals digitally, for example, by means of at least one microprocessor and/or at least one digital signal processor (DSP) and/or by means of a programmable logic chip (FPGA) and/or by means of a customer specifically programmed logic chip (ASIC). The program-code executed during operation of the measuring system in one or more of the above described microprocessors, or digital signal processors, of the measuring system-electronics ME can be stored persistently, e.g. in one or more non-volatile data memories (EEPROM) of the measuring system-electronics ME and in the case of the startup of the same be loaded into a volatile data memory (RAM) provided in the measuring system-electronics ME, thus the measuring- and control electronics DSV, e.g. integrated in the microprocessor. The oscillation signals s1, s2 for a processing in the microprocessor, or in the digital signal processor, are, of course, first converted by means of corresponding analog to-digital converters (A/D) into corresponding digital signals, for example, by digitizing the signal voltages of the oscillation signals s1, s2; compare, for this, for example, the above cited U.S. Pat. No. 6,311,136 and US-A 2011/0271756. Accordingly, in an additional embodiment of the invention, there is provided in the measuring system-electronics ME, for example, in the above described measuring- and control electronics DSV, a first analog to-digital-converter for the oscillatory signal s1 as well as a second analog to-digital-converter for the oscillatory signal s2 and/or in the measuring system-electronics ME at least one non-volatile electronic data memory EEPROM adapted to make available digital data, for example, even without an applied operating voltage. By means of the measuring- and control electronics DSV, additionally, also the above-mentioned phase sequence and/or the above-mentioned frequency sequence can be generated, for example, also sent to a corresponding digital phase output, or a corresponding digital frequency output, and so be provided for further processing in the measuring system-electronics ME. For the case, in which the measuring system-electronics ME is formed by means of the above-mentioned drive electronics Exc as well as by means of the above described measuring- and control electronics DSV, their phase output can be electrically connected with a phase input of a phase comparator provided in the drive electronics Exc, for example, also forming a component of the above described phase control loop (PLL), and, additionally, the phase comparator can be adapted based on the phase sequence to detect a phase difference between the above referenced signal component $e1_N$ of the driver signal e1 and at least one of the wanted components $s1_N$, $s2_N$ and/or to ascertain a size of the phase difference. In an additional embodiment of the invention, the measuring—and control electronics DSV is, furthermore, also adapted to produce the above described, first and second wanted component sequences and to output at least one of the wanted component sequences on a digital amplitude output. The above-mentioned amplitude output of the measuring- and control electronics DSV can, furthermore, for example, also be electrically connected with an amplitude input of the drive electronics Exc registering an amplitude of the oscillations of the at least one vibration element 10 and the drive electronics Exc can, additionally, be adapted, based on the amplitude sequence, so to generate the driver signal e1 that the oscillations of the at least one vibration element 10, or its wanted oscillations, reach and do not lastingly ex- or subceed a predetermined oscillation amplitude.

As already mentioned, vibration-type measuring transducers, consequently the vibronic measuring systems formed therewith, can during their lifetime be exposed to a large number of loadings, which can bring about considerable deviations of the measuring transducer, or of the measuring system, from an earlier ascertained reference state, for example, an original delivery state and/or a state at the start-up of the measuring system on-site; this, especially, also in such a manner that the at least one vibration element, for instance due to overloading, experiences such damage that its oscillation characteristics change, or that the measuring transducer, as a whole, is damaged, because as a result, among other things, also one or more system functions (transfer functions) of the measuring transducer, thus measuring functions formed in the measuring system, correspondingly change in comparison with a (reference-) system function of the original measuring transducer, or (reference-)measurement function of the measuring system. Changes of the oscillation characteristics of the at least one vibration element can stem, for example, from changes of one or more of the modal parameters, bending stiffness, mass and/or damping, determining one of the above described oscillation modes, leading to the result that one or more (eigen-)oscillation forms differ from how they were in the reference state of the measuring transducer; this regularly also in such a manner that an original—typically essentially uniform or homogeneous—distribution of the above described (system-)parameters, (modal) bending stiffness, (modal) mass and (modal) damping, is changed, namely increasingly distributed non-uniformly. Moreover, during the lifetime of the measuring system also the at least one oscillation exciter, as well as also each of the oscillation sensors, can be subject to changes, for instance, by thermally related (over-)loading, or aging, relevant for the accuracy of measurement, for instance, in such a manner that, as a result, also an electrical impedance of the measuring transducer is changed. (Over-)loadings leading to a damaging of the tube arrangement, or of the measuring transducer as a whole, can be, for example, high (over-)temperatures or temperature shock, too high pressures or pressure surges in the measured substance, process line originating, excessive clamping forces and/or too strong shaking forces imposed on the measuring transducer, damaging properties of the measured substance conveyed in the measuring transducer, and material fatigue and result, among other things, in significantly reduced thickness of the tube wall, for instance caused by corrosion and/or abrasion of the tube wall of the at least one tube effected by the measured substance, and in significantly reduced flow cross section of the tube arrangement, for instance, as a result of an at least partial plugging of the tube arrangement and/or as a result of a deposit on the measured substance contacting inside of the tube wall, in a plastic deformation of the at least one tube or a crack formation within the tube arrangement, for example, the tube wall, consequently even mean that the measuring transducer is, among other things, no longer safe. System functions affected by such damage to the measuring transducer can correspond, for example, to one or more (modal) oscillation responses of the at least one vibration element relevant for measuring the at least one measured variable, for example, a functional dependence of an amplitude of the above described, wanted oscillations on the driver signal, or a functional dependence of an amplitude of the above described Coriolis oscillations on the driver signal and mass flow, and characterize a measurement function involving one or more of the above described oscillation responses, according to which measurement function the measuring system lastly converts registered measured variables into measured values. Examples of such system functions of the measuring transducer include, for instance, a mass flow to phase difference-system function, namely a system function of the measuring transducer, according to which the above-mentioned phase difference of the first wanted-signal components of the oscillation signals depends on mass flow, system functions containing one or more resonance frequencies of the at least one vibration element as (system-) parameter, such as, for instance, a density to resonant frequency-system function, for example, a system function of the measuring transducer, according to which the above-mentioned resonant frequency f1 depends on the density, and system functions containing damping of oscillations as (system-)parameter, such as, for instance, a viscosity to damping-function, for example, a system function of the measuring transducer, according to which a damping of the wanted oscillations depends on viscosity. Affected can be, accordingly, however, also those measuring functions of the measuring system, which are based on one or more of the above described system functions of the measuring transducer, for example, a mass flow to measured value-function involving the mass flow to phase difference-system function as well as the above-mentioned phase difference mass flow-measured value-characteristic line function of the measuring system-electronics, namely a measurement function of measuring system, according to which therewith ascertained mass flow-measured values depend on the mass flow, and/or a density to measured value-function of measuring system involving the above-mentioned density to resonant frequency-system function of the measuring transducer as well as the above-mentioned resonant frequency to density-measured value-characteristic line function of the measuring system-electronics, and/or even a viscosity to measured value-characteristic line function of the measuring system involving the above-mentioned viscosity to damping-system function of the measuring transducer as well as the above-mentioned damping to viscosity-measured value-characteristic line function of the measuring system-electronics. The damage to the measuring transducer, or its tube arrangement, can especially lead to the fact that one or more system functions, or a (system-)parameter characterizing a corresponding measurement function, for example, a (scale-)zero point and/or a (measuring-)sensitivity (slope of the characteristic line function) of the above described phase difference to mass flow-measured value-characteristic line function corresponding to a change of the phase difference of the first wanted-signal components referenced to a change of the mass flow, are subject to corresponding temporal changes, especially have a drift. As a result of such, in given cases, also multiply and/or for a longer time period recurringly arising (over-)loadings of the measuring transducer, such can in the course of its operating time be so significantly damaged that its ability to function, or an ability of the measuring system, as a whole, to function, is lost in considerable measure, or completely; this, for example, also in such a manner that, as a result, a disturbance, thus a malfunction of the measuring system leading, in given cases, also to measurement errors in the ascertaining of the measured values, is present, for instance, because an integrity of at least one of the oscillation signals, and measured values won therefrom, is significantly reduced, consequently an accuracy of measurement of the measuring system, with which it ultimately maps the measured variable to be registered into the corresponding measured values, is decreased significantly compared with a beginning, or nominal, accuracy of measurement of the original, intact measuring system. In order to be able to detect and, in given cases, announce possible changes of the measuring transducer, for example, of its mechanical properties and/or its electrical properties, thus a defect of the measuring transducer, or of the measuring system formed therewith, attributable thereto, as early as possible and as reliably as possible, it is, consequently, furthermore, provided, at times, for example, also recurringly, or regularly, to place the measuring system in a test operation and during that then to check, whether such a disturbance, or malfunction, of measuring system is present.

For checking the measuring system according to the invention, a first (test-)magnet 61 is positioned at a first test position P1 outside of the measuring transducer, for example, externally at the above described transducer-protective housing 100, with a appropriately predetermined (test-)orientation, in order to bring about a first (test-) magnetic field H1 defined as regards its magnetic flux and/or its magnetic flux density B1, in such a manner that the (test-)magnetic field H1, which is necessarily partially outside the measuring transducer, partially also passes through the measuring transducer; this especially in such a manner that the (test-)magnetic field H1 within the measuring transducer is present also in the region of the vibration element and/or the oscillation sensor 51. For the above described case, in which at least one electrical coil is secured at the vibration element 10, for instance, as a component of a plunger coil secured partially at the vibration element 10, the test position P1 can, for example, be so selected that—, as well as also indicated in FIG. 3*b*—the (test-)magnetic field H of the (test-)magnet 61 positioned at the test position P1 partially also passes through one or more of the above described coils, for example, the above-mentioned (sensor-) coil of the oscillation sensor 51; this, for example, also in such a manner that the above-mentioned induced voltage $u_{r1}$ has an amplitude also co-determined by the (test-)magnetic field H, thus an amplitude dependent on the corresponding magnetic flux of the test magnet P1. Alternatively thereto or in supplementation thereof, for the above described case, in which at least one (permanent-)magnet is secured on the vibration element, for instance, as a component of a plunger coil secured partially on the vibration element, the test position P1 can also be so selected that as a result of the (test-)magnetic field H1 of the (test-)magnet positioned at the test position P1 a force acts on the above described (permanent-)magnet secured on the vibration element 10, for example, the above described (exciter-)magnet of the oscillation exciter 41 and/or the above described (sensor-) magnet of the oscillation sensor 51. The (test-)magnet 61 can, for example, be positioned at the test position P1 such that the (test-)magnet 61 is secured releasably on the trans-ducer-protective housing 100. For such purpose, there can be provided externally at the transducer-protective housing 100 corresponding positioning aids defining the test position P1 for example, in the form of a seat provided on its wall, especially formed in, or applied on, the wall or by means of a stud bolt secured on the wall, in given cases, also having a screw thread.

For producing a first test signal p1, namely an oscillation signal (s1→p1) provided by the first oscillation sensor in the case of first (test-) magnet 61 positioned at the first test position P1 with the first (test-) magnetic field passing through the measuring transducer, the vibration element 10 is correspondingly caused to vibrate, for example, actively excited, by means of the oscillation exciter 41 to execute resonant oscillations serving as test oscillations and/or to execute mechanical oscillations outside of resonance and serving as test oscillations. For example, mechanical oscil-lations corresponding to the above described wanted oscil-lations and/or forced mechanical oscillations deviating therefrom can serve as test oscillations. The test signal p1 can then be examined based on one or more characterizing signal parameters, for example, a phase angle, a (signal-) frequency or a (signal-) amplitude of the test signal p1, or parameter values appropriately quantifying the signal parameters, concerning its behavior, e.g. possible deviation from corresponding specifications. Accordingly, in an addi-tional embodiment of the invention, the test signal is used for ascertaining at least one parameter value for a signal parameter characterizing the test signal p1, especially a phase angle, a (signal-) frequency or a (signal-) amplitude of the test signal p1.

According to the invention, it is, furthermore, provided to use the test signal p1, for example, the parameter values won therefrom for the at least one signal parameter characterizing the test signal p1, to ascertain at least a first characterizing number value, which quantifies a first oscillation character-izing number characterizing oscillations of the vibration element, for example, in terms of a deflection of the vibra-tion element, a spring stiffness of the vibration element relevant for the oscillations of the vibration element or a damping of the oscillations of the vibration element, or a physical (measurement- or observation-)variable derived therefrom, as well as to compare the first characterizing number value with one or more (characterizing number-) threshold values for the first oscillation characterizing num-ber, for example, as earlier ascertained as a result of corre-sponding comparative measurements using one or more intact (reference-)measuring systems and/or one or more non-intact (reference-)measuring systems. The (characteriz-ing number-)threshold values can, additionally, for example, be appropriately predetermined, or set, by the manufacturer of the measuring system or at the start-up of the measuring system on-site, and, for example, stored in the above men-tioned non-volatile electronic data memory EEPROM of the measuring system-electronics ME. Based on such a com-parison of the at least one characteristic number value with one or more (characterizing number-)threshold values according to the invention, a disturbance of the measuring system, especially the measuring transducer, is detected when the characterizing number value exceeds a first (char-acterizing number-)threshold value, for example, a first (characterizing number-)threshold value representing a no (longer) intact measuring system, and/or when the charac-terizing number value has left a first (characterizing num-ber-)value range bounded by the first (characterizing num-ber-)threshold value, for example, a range representing an intact measuring system. For the above described case, in which the first vibration element is inserted through a (push in-)opening in the transducer-protective housing and secured releasably to the transducer-protective housing, the first (characterizing number-)threshold value can also be so predetermined, or established, that it shows a vibration element positioned incorrectly in the transducer-protective housing and/or a vibration element secured incorrectly to the transducer-protective housing.

As already indicated, the ascertaining of the at least one characterizing number value can comprise ascertaining a phase angle of the test signal p1, for example, a phase angle of an electrical (alternating-)voltage of the test signal p1, and/or ascertaining a (signal-)amplitude of the test signal p1, for example, an amplitude of an electrical (alternating-) voltage of the test signal p1, and/or ascertaining a (signal-) frequency of the test signal p1, for example, a frequency of an electrical (alternating-)voltage of the first test signal. In addition to the test signal, additionally, also the above-mentioned driver signal e1 can be used to ascertain the first characterizing number value; this, especially, also for the above described case, in which the first oscillation charac-terizing number shows a spring stiffness of the vibration element or a damping of oscillations of the vibration ele-ment, or a (measuring- or observation-)variable related thereto. In an additional embodiment of the invention, it is, consequently, furthermore, provided to use the driver signal e1 for ascertaining at least one parameter value of a signal parameter characterizing the driver signal, for example, a phase angle, a (signal-)frequency or a (signal-)amplitude of the driver signal e1. The at least one parameter value for the signal parameter characterizing the driver signal e1 can then be used for ascertaining the first characterizing number value, for example, in such a manner that a calculated value ascertained therewith serves as a first characterizing number value and/or in such a manner that both the parameter value for the signal parameter characterizing the test signal p1 as well as also the parameter value for the signal parameter characterizing the driver signal e1 serves for ascertaining the first characterizing number value, especially in such a man-ner that a calculated value ascertained therewith serves as a first characterizing number value. For the other previously indicated case, in which the measuring transducer includes supplementally to the oscillation sensor 51 also the oscilla-tion sensor 52, the vibration element is in an additional embodiment of the invention caused to vibrate, in order to produce, for example, also at the same time with the test signal p1, a second test signal p2, namely a second test signal in the form of an oscillation signal (s2→p2) in the case of (test-)magnet 61 positioned at the test position P1, or in the case of the (test-)magnetic field H passing through the oscillation sensor 52 provided in the measuring transducer. Test signal p2 can, in turn, in given cases, also be used together with the test signal p1 for ascertaining the first characterizing number value, for example, in such a manner that the first characterizing number value is ascertained based on a sum signal and/or a difference signal formed by means of the two test signals p1, p2.

For ascertaining the first characterizing number value for the first oscillation characterizing number, supplementally to the first (test-)magnetic field H1, furthermore, also one or more (test-)magnetic fields deviating both from the (test-) magnetic field H as well as also from one another can be used. For such purpose, in an additional embodiment of the invention, it is, furthermore, provided to position the (test-) magnet 61 and/or, as well as also indicated in FIG. 1, to position a second (test-)magnet 62 in a second test position P2 outside of the measuring transducer and removed from the test position P1, and, for example, also characterized identically to the test position P1, for effecting a second (test-)magnetic field H' also partially passing through the measuring transducer, for example, also in the region of the vibration element, for example, a second (test-)magnet 62 likewise set, or applied, externally at the transducer-protective housing 100. Test position P2 can, for example, be so selected that, such as shown in FIG. 2, or directly evident from a combination of FIGS. 1 and 2, an imaginary connecting axis imaginarily connecting the two test positions P1, P2 extends in parallel with the vibration element and/or with an imaginary connecting axis imaginarily connecting the oscillation sensor 51 and the oscillation exciter 41. Test position P2 can, for example, however, also be so selected that the imaginary connecting axis imaginarily connecting the test positions P1, P2 extends through the oscillation exciter 41 and/or through the first oscillation sensor, thus through the vibration element, or intersects or is skew to the above-mentioned imaginary connecting axis imaginarily connecting the oscillation sensor 51 and the oscillation exciter 41. At least after the (test-)magnetic field H' is established, the vibration element is, in given cases, caused to vibrate anew, in order so to produce a third test signal p3, namely an oscillatory signal s1 (s1→p3) provided by the oscillation sensor 51 in the case of the second (test-) magnetic field H2 passing through the measuring transducer. Test signal p3 can thereafter be used to ascertain at least a second characterizing number value, namely a characterizing number value quantifying a second oscillation characterizing number characterizing oscillations of the vibration element. The second characterizing number value is, in turn, for example, taken into consideration, or caused to enter in, in the case of ascertaining the first characteristic number value. Alternatively or supplementally, the second characterizing number value can also be compared with one or more (characterizing number-)threshold values earlier ascertained for the second oscillation characterizing number, for example, in order to detect a disturbance of the measuring transducer, or of the measuring system formed therewith; this, for example, also in such a manner that a disturbance is detected, when the second characterizing number value exceeds a predetermined second (characterizing number-) threshold value, especially a second (characterizing number-)threshold value representing a non-intact measuring system, or when the second characterizing number value has left a second (characterizing number-)value range bounded by the second (characterizing number-)threshold value, especially a second (characterizing number-)value range representing an intact measuring system; this, especially, also for the case, in which the first characterizing number value has not exceeded the first (characterizing number-) threshold value, or has not left the second (characterizing number-)value range bounded by the first (characterizing number-)threshold value.

For the above described case, in which the measuring transducer has one or more magnetic field sensors, the at least one (test-)magnet 61, i.e. the (test-)magnetic field established therewith in the measuring transducer, can, furthermore, also be used to check the response behavior of the magnetic field sensors to the (test-)magnetic field and the response behavior of the measuring system-electronics ME to changes of the magnetic field measurement signals. Alternatively or supplementally, the at least one (test-) magnet 61, i.e. the (test-)magnetic field established therewith in the measuring transducer, can, furthermore, also be used to check a magnetic resistance, or an inductance, of the oscillation exciter and/or the oscillation sensors, or to examine for possible changes compared with an original magnetic (reference-)resistance, or an original (reference-)inductance.

For ending the checking of the measuring system, the (test-)magnet 61, or the (test-)magnets 61, 62, is/are removed from the test positions P1, P2, in such a manner that the measuring transducer no longer experiences a (test-) magnetic field. For the above described other case, in which the oscillatory signal s1 serves in (normal) measuring operation as measurement signal m1, namely is used for ascertaining measured values for the at least one measured variable of the measured substance flowing through the measuring transducer, in an additional embodiment of the invention, it is provided to use the oscillatory signal s1 provided by the oscillation sensor 51 as measurement signal m1 also in the case of vibration element contacted by measured substance only in the case of no (test-)magnetic field passing through the measuring transducer, and to ascertain measured values for the at least one measured variable based on the oscillatory signal s1 only in the case of no (test-)magnetic field passing through the measuring transducer; this, especially, also after ending the checking of the measuring system, or only for the case, in which the first characterizing number value has not exceeded the predetermined, first (characterizing number-)threshold value, or has not left the first (characterizing number-)value range.

The invention claimed is:

1. A method for checking a vibronic measuring system for ascertaining at least one measured variable of a flowable measured substance, comprising:

said vibronic measuring system including:
  a measuring transducer including:
    a vibration element;
    an electromechanical oscillation exciter for converting electrical power into mechanical power serving for exciting and maintaining forced mechanical oscillations of the vibration element; and
    an electrodynamic first oscillation sensor for registering mechanical oscillations of the vibration element at a first oscillation measuring point and for providing at least one electrical, oscillation signal at least partially representing oscillatory movements of the vibration element; and
  a transducer-protective housing for the measuring transducer, wherein the at least one oscillation exciter as well as also the first oscillation sensor as well as the vibration element are arranged within the transducer-protective housing;
the method including steps of:

positioning a first test magnet at a first test position outside of the measuring transducer for producing a first test magnetic field partially passing through the measuring transducer;

causing the vibration element to vibrate to generate a first test signal ultimately provided by the first oscillation sensor in the case of the first test magnet positioned at the first test position, and in the case of the first test magnetic field passing through the measuring transducer;

using the first test signal for ascertaining at least a first characterizing number value, which quantifies a first oscillation characterizing number characterizing oscillations of the vibration element;

comparing the first characterizing number value with one or more characterizing number threshold values for the first oscillation characterizing number; and detecting a disturbance of the measuring system if the first characterizing number value exceeds a first characterizing number threshold value, or when the first characterizing number value has left a first value range bounded on one end by the first characterizing number threshold value.

2. The method as claimed in claim 1, wherein the positioning of the first test magnet at the first test position includes a releasable securing of the first test magnet on the transducer-protective housing.

3. The method as claimed in claim 1, wherein the measuring transducer includes at least one electrodynamic, second oscillation sensor for providing at least one electrical oscillation signal at least partially corresponding to oscillatory movements of the vibration element, and wherein the second oscillation sensor is arranged within the transducer-protective housing.

4. The method as claimed in claim 3, further comprising:

causing the vibration element to vibrate for generating a second measurement signal ultimately provided by the second oscillation sensor in the case of a test magnetic field passing not through the measuring transducer, equally as well in the case of vibration element contacted by measured substance, in such a manner that the second measurement signal has a wanted component with a phase angle dependent on mass flow of the measured substance and/or having a signal frequency dependent on density of the measured substance; and using the second measurement signal for ascertaining the measured value.

5. The method as claimed in claim 4, further comprising:

using the second measurement signal for ascertaining at least one signal parameter value for a signal parameter characterizing the second measurement signal; and using the at least one parameter value for the signal parameter characterizing the second measurement signal for ascertaining the at least one measured value.

6. The method as claimed in claim 4, further comprising:

using the first measurement signal for ascertaining at least one signal parameter value for a signal parameter characterizing the first measurement signal; and using the at least one parameter value for the signal parameter characterizing the first measurement signal for ascertaining the at least one measured value.

7. The method as claimed in claim 1, further comprising causing the vibration element to vibrate for producing a second test signal provided by the second oscillation sensor in the case of the first test magnet positioned at the first test position.

8. The method as claimed in claim 7, further comprising using the second test signal for ascertaining the first characterizing number value.

9. The method as claimed in claim 8, further comprising positioning the first test magnet and/or a second test magnet at a second test position removed from the first test position and outside of the measuring transducer.

10. The method as claimed in claim 9, wherein an imaginary connecting axis imaginarily connecting the first and second test positions extends through the oscillation exciter and/or through the first oscillation sensor.

11. The method as claimed in claim 10, further comprising causing the first vibration element to vibrate for generating a third test signal ultimately provided by the first oscillation sensor in the case of the second test magnetic field passing through the measuring transducer.

12. The method as claimed in claim 11, further comprising using the third test signal for ascertaining at least a second characterizing number value, which quantifies a second oscillation characterizing number characterizing oscillations of the vibration element.

13. The method as claimed in claim 12, further comprising comparing the second characterizing number value with one or more characterizing number threshold values earlier ascertained for the second oscillation characterizing number.

14. The method as claimed in claim 12, further comprising detecting a disturbance of the measuring system when the second characterizing number value exceeds a second characterizing number threshold value or has left a second characterizing number value range bounded by the second characterizing number threshold value.

15. The method as claimed in claim 1, further comprising:

causing a measured substance to flow through the measuring transducer, the oscillatory signal provided by the first oscillation sensor having a phase angle dependent on mass flow of the measured substance, or a signal frequency depending on density of the measured substance.

16. The method as claimed in claim 1 further comprising:

causing the first vibration element to vibrate for producing a first measurement signal, namely an oscillation signal provided by the first oscillation sensor in the case of a test magnetic field not passing through the measuring transducer, equally, and in the case of first vibration element contacted by measured substance in such a manner that the first measurement signal has a wanted component with a phase angle dependent on mass flow of the measured substance and/or a frequency dependent on density of the measured substance; and using the first measurement signal for ascertaining a measured value for a measured variable of the measured substance flowing through the measuring transducer, and only for the case in which the first characterizing number value has not exceeded the predetermined, first characterizing number threshold value, and has not left the first characterizing number value range.

17. The method as claimed in claim 16, wherein each of the first and second measurement signals has, in each case, a wanted component having a phase angle dependent on mass flow of the measured substance, in such a manner that a phase difference dependent on mass flow of the measured substance exists between the wanted component of the first measurement signal and the wanted component of the second measurement signal, namely a difference between the phase angle of the first measurement signal and the phase angle of the second measurement signal.

18. The method as claimed in claim 1, further comprising removing the first test magnet from the measuring transducer for ending the checking of the measuring system in such a manner that the first test magnetic field no longer passes through the measuring transducer.

19. The method as claimed in claim 1, wherein the vibration element is secured to the transducer-protective housing.

20. The method as claimed in claim 1, wherein the first characterizing number threshold value represents a vibration element positioned incorrectly in the transducer-protective housing and/or a vibration element secured incorrectly to the transducer-protective housing.

21. The method as claimed in claim 1, wherein the ascertaining of the at least one characterizing number value includes ascertaining a phase angle of the first test signal.

22. The method as claimed in claim 1, wherein the ascertaining of the at least one characterizing number value includes ascertaining a signal amplitude of the first test signal.

23. The method as claimed in claim 1, wherein the ascertaining of the at least one characterizing number value includes ascertaining a signal frequency of the first test signal.

24. The method as claimed in claim 1, further comprising using the first test signal for ascertaining at least one parameter value for a signal parameter characterizing the phase angle, a signal frequency or a amplitude of the first test signal.

25. The method as claimed in claim 24, further comprising using the parameter value for the signal parameter characterizing the first test signal for ascertaining the first characterizing number value.

26. The method as claimed in claim 1, further comprising producing an electrical exciter power in an electrical driver signal feeding the at least one oscillation exciter for causing the vibration element to vibrate.

27. The method as claimed in claim 26, further comprising using the driver signal for ascertaining at least one parameter value for a signal parameter characterizing a phase angle, a signal frequency or a signal amplitude of the driver signal.

28. The method as claimed in claim 24, further comprising using the parameter value for the signal parameter characterizing a driver signal for ascertaining the first characterizing number value.

29. The method as claimed in claim 24, further comprising using both the parameter value for the signal parameter characterizing the first test signal as well as also the parameter value for the signal parameter characterizing a driver signal for ascertaining the first characterizing number value.

30. The method as claimed in claim 1, wherein at least one permanent magnet is secured on the vibration element.

31. The method as claimed in claim 1, wherein at least one electrical coil is secured on the vibration element.

32. The method as claimed in claim 1, wherein the first test position is so selected that the first test magnetic field of the first test magnet positioned at the first test position passes also partially through a sensor coil in such a manner that an electrical alternating voltage induced in the sensor coil has an amplitude dependent on, or co-determined by, the first test magnetic field.

33. The method as claimed in claim 1, wherein the vibration element is at least sectionally straight and/or at least sectionally bent.

34. The method as claimed in claim 1, wherein the measuring system further includes a measuring system-electronics electrically coupled, with the measuring transducer, namely both with oscillation exciter as well as also the oscillation sensor, namely a measuring system-electronics formed by means of at least one microprocessor and/or accommodated in an electronics-protective housing, for operating the measuring transducer and for evaluating oscillation signals delivered by the measuring transducer.

* * * * *